(12) United States Patent
Larsson et al.

(10) Patent No.: US 11,944,197 B2
(45) Date of Patent: Apr. 2, 2024

(54) WATER SPILLAGE PROTECTION FOR TABLE PURIFIER

(71) Applicant: INTER IKEA SYSTEMS B.V., Delft (NL)

(72) Inventors: Paul Larsson, Staffanstorp (SE); David Wahl, Älmhult (SE); Henrik Telander, Limhamn (SE); Bofeng Peng, Fujian (CN); Derong Jian, Fujian (CN); Tao Wang, Fujian (CN); Zhongtao Luo, Fujian (CN); Zhisuo Chen, Fujian (CN); Dianqiu Zhang, Fujian (CN); Xiaoming Lian, Fujian (CN); Zhenqi Yan, Fujian (CN); Youxiong Zhang, Fujian (CN)

(73) Assignee: INTER IKEA SYSTEMS B.V., Delft (NL)

(\*) Notice: Subject to any disclaimer, the term of this patent is extended or adjusted under 35 U.S.C. 154(b) by 0 days.

(21) Appl. No.: 18/007,861

(22) PCT Filed: Jun. 3, 2021

(86) PCT No.: PCT/SE2021/050528
§ 371 (c)(1),
(2) Date: Dec. 2, 2022

(87) PCT Pub. No.: WO2021/246949
PCT Pub. Date: Dec. 9, 2021

(65) Prior Publication Data
US 2023/0189994 A1 Jun. 22, 2023

(30) Foreign Application Priority Data

Jun. 3, 2020 (CN) .......................... 202010495352.4
Oct. 2, 2020 (SE) ................................... 2051152-3
Oct. 2, 2020 (SE) ................................... 2051153-1

(51) Int. Cl.
*B01D 46/00* (2022.01)
*A47B 13/00* (2006.01)
(Continued)

(52) U.S. Cl.
CPC ............ *A47B 97/00* (2013.01); *A47B 13/003* (2013.01); *F24F 8/108* (2021.01); *F24F 8/158* (2021.01); *A47B 2200/008* (2013.01)

(58) Field of Classification Search
CPC ......... B01D 53/14; B01D 53/18; F24F 8/108; F24F 8/158; F24F 6/04; F24F 13/28; A47B 13/003; A47B 97/00; A47B 2200/008
(Continued)

(56) References Cited

U.S. PATENT DOCUMENTS 4,248,162 A \* 2/1981 Skeist .................... A47B 13/08
108/50.13
4,751,125 A \* 6/1988 Ofterdinger ........... A47B 96/18
428/161
(Continued)

FOREIGN PATENT DOCUMENTS

AU          2020100305 A4    4/2020
CN            2618090 Y      5/2004
(Continued)

OTHER PUBLICATIONS

PCT International Search Report for PCT Application No. PCT/SE2021/050528 dated Jun. 21, 2021 (5 pages).
(Continued)

*Primary Examiner* — Minh Chau T Pham
(74) *Attorney, Agent, or Firm* — Merchant & Gould P.C.

(57) ABSTRACT

The disclosure relates to a table (100). The table (100) has a table top (102), a plurality of legs (104) connectable to the table top (102), and an air purifier (106) adapted to be placed
(Continued)

below the table top (102). A bottom side of the table top (102) is provided with at least one groove (112) extending in a circumferential direction for preventing liquid from traveling from an outer edge of the table top (102) along the bottom side of the table top (102) and reaching an inner section of the air purifier (106). The disclosure also relates to a method for purifying air using a table (100).

15 Claims, 23 Drawing Sheets

(51) Int. Cl.
*A47B 97/00* (2006.01)
*F24F 8/108* (2021.01)
*F24F 8/158* (2021.01)

(58) Field of Classification Search
USPC .......... 55/385.1; 454/230, 306, 338; 108/50, 108/161
See application file for complete search history.

(56) References Cited

U.S. PATENT DOCUMENTS

| | | | | |
|---|---|---|---|---|
| 5,230,720 | A * | 7/1993 | Kendall | F24F 8/108 55/467 |
| 5,417,433 | A * | 5/1995 | Phillips | F24F 9/00 273/287 |
| 9,086,072 | B1 * | 7/2015 | Davis | F04D 17/16 |
| 9,189,910 | B2 * | 11/2015 | Otsuka | G07D 11/50 |
| 2004/0020363 | A1 * | 2/2004 | LaFerriere | B01D 46/0028 55/472 |
| 2004/0118289 | A1 | 6/2004 | Chang et al. | |
| 2020/0289968 | A1 | 9/2020 | Scholten et al. | |
| 2021/0353794 | A1 * | 11/2021 | Popa-Simil | G06V 40/10 |

FOREIGN PATENT DOCUMENTS

| | | | | |
|---|---|---|---|---|
| CN | 205162460 U | | 4/2016 | |
| CN | 205242545 U | | 5/2016 | |
| CN | 206046089 U | | 3/2017 | |
| CN | 209265593 U | | 8/2019 | |
| CN | 110701702 A | | 1/2020 | |
| CN | 111664518 A | | 9/2020 | |
| CN | 214701135 U | * | 11/2021 | .............. F24F 13/28 |
| CN | 114904600 A | * | 8/2022 | .............. B01D 53/14 |
| TW | M521389 U | | 5/2016 | |
| WO | 2019009696 A1 | | 1/2019 | |

OTHER PUBLICATIONS

PCT Written Opinion for PCT Application No. PCT/SE2021/050528 dated Jun. 21, 2021 (4 pages).
"Airea air purifier", retrieved from the Internet on Mar. 2, 2021 as http://www.trendhunter.com (3 pages).
Office Action dated Apr. 21, 2023, in the corresponding Chinese Application No. 202180039584.1 (19 pages including English Translation).

* cited by examiner

WATER SPILLAGE PROTECTION FOR TABLE PURIFIER

This application is a National Stage Application of PCT/SE2021/050528, filed 3 Jun. 2021, which claims benefit of Serial No. 202010495352.4, filed 3 Jun. 2020 in China, Serial No. 2051152-3, filed 2 Oct. 2020 in Sweden, and Serial No. 2051153-1, filed 2 Oct. 2020 is Sweden, and which applications are hereby incorporated by reference in their entireties. To the extent appropriate, a claim of priority is made to each of the above disclosed applications.

TECHNICAL FIELD

The invention relates to a table with an air purifier and a method for purifying air using such a table.

BACKGROUND ART

As is well known to those skilled in the art, an air cleaning apparatus is an appliance which removes dust or bacteria from air to clean the air. The air cleaning apparatus is provided with a blowing unit (fan unit) and a filtering unit. The blowing unit functions to suck room air and forcibly circulate the air. The filtering unit functions to remove the dust or bacteria from the air which is circulated by the blowing unit. The blowing unit includes a blowing fan provided in the cabinet and a motor to drive the blowing fan. The filtering unit is provided at an air inlet side or an air outlet side for the blowing unit and includes a filter of a net structure.

When the air cleaning apparatus has been used for a predetermined period of time, the dust collects on the filters as well as the blowing unit. Thus, in order to keep the air cleaning apparatus clean, a user must remove the blowing unit and the filtering unit from the cabinet of the air cleaning apparatus to clean the blowing unit and the filtering unit at regular intervals.

US 2004/0118289 A1 discloses a conventional air cleaning apparatus. The air cleaning apparatus includes an air cleaning unit moved in a vertical direction to clean room air, allowing the room air to be effectively and uniformly cleaned in a short period of time. The air cleaning apparatus includes a longitudinal cabinet to stand on a support surface. An air cleaning unit is installed in the cabinet to move in the vertical direction and is provided with a blowing unit and a filtering unit to clean air. An elevating unit is provided at least one of the cabinet and the air cleaning unit to move the air cleaning unit in the vertical direction. The air cleaning apparatus also includes upper and lower sensors, and a control unit.

This type of air cleaning apparatus is not aesthetically appealing and takes up a great deal of space in a room. This problem can be solved by including the air cleaning apparatus in a piece of furniture, such as a table.

A problem with such a solution is that typical use of the table may cause damage to sensitive components in the air cleaning device.

SUMMARY OF THE INVENTION

It is an object of the present invention to provide an improvement of the air purifiers according to prior art. A particular object is to provide a table with an integrated air purifier.

According to a first aspect, these and other objects, and/or advantages that will be apparent from the following description of embodiments, are achieved, in full or at least in part, by a table. The table comprises a table top, a plurality of legs connectable to the table top, and an air purifier adapted to be placed below the table top. A bottom side of the table top is provided with at least one groove extending in a circumferential direction for preventing liquid from traveling from an outer edge of the table top along the bottom side of the table top and reaching an inner section of the air purifier.

This is advantageous in that liquids will be prevented from being sucked into critical components of the air purifier by means of the air flow provided by the same. Specifically, the at least one groove will hinder liquids from traveling from the outer edge of the table top along the bottom side thereof to reach the filters of the air purifier while simultaneously not lowering the air flow rate or increasing any sound caused by the air flow. It is further important that the mechanical stability of the table is not affected by the at least one groove.

According to a second aspect, the objects are achieved in full, or at least in part, by a method for purifying air using a table comprising a table top, a plurality of legs connected to the table top, and an air purifier placed below the table top. The method comprises feeding air into the air purifier, preventing liquid from traveling from an outer edge of the table top along the bottom side of the table top and reaching an inner section of the air purifier by means of at least one groove extending in a circumferential direction provided on bottom side of the table top, and feeding purified air out of the air purifier.

It should be noted that the different embodiments of the device that is described above are exemplifying only. The embodiments may be combined with each other in any suitable way depending on the requirements established for the fuel dispenser.

Effects and features of the second aspect of the present invention are largely analogous to those described above in connection with the first aspect the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1A:
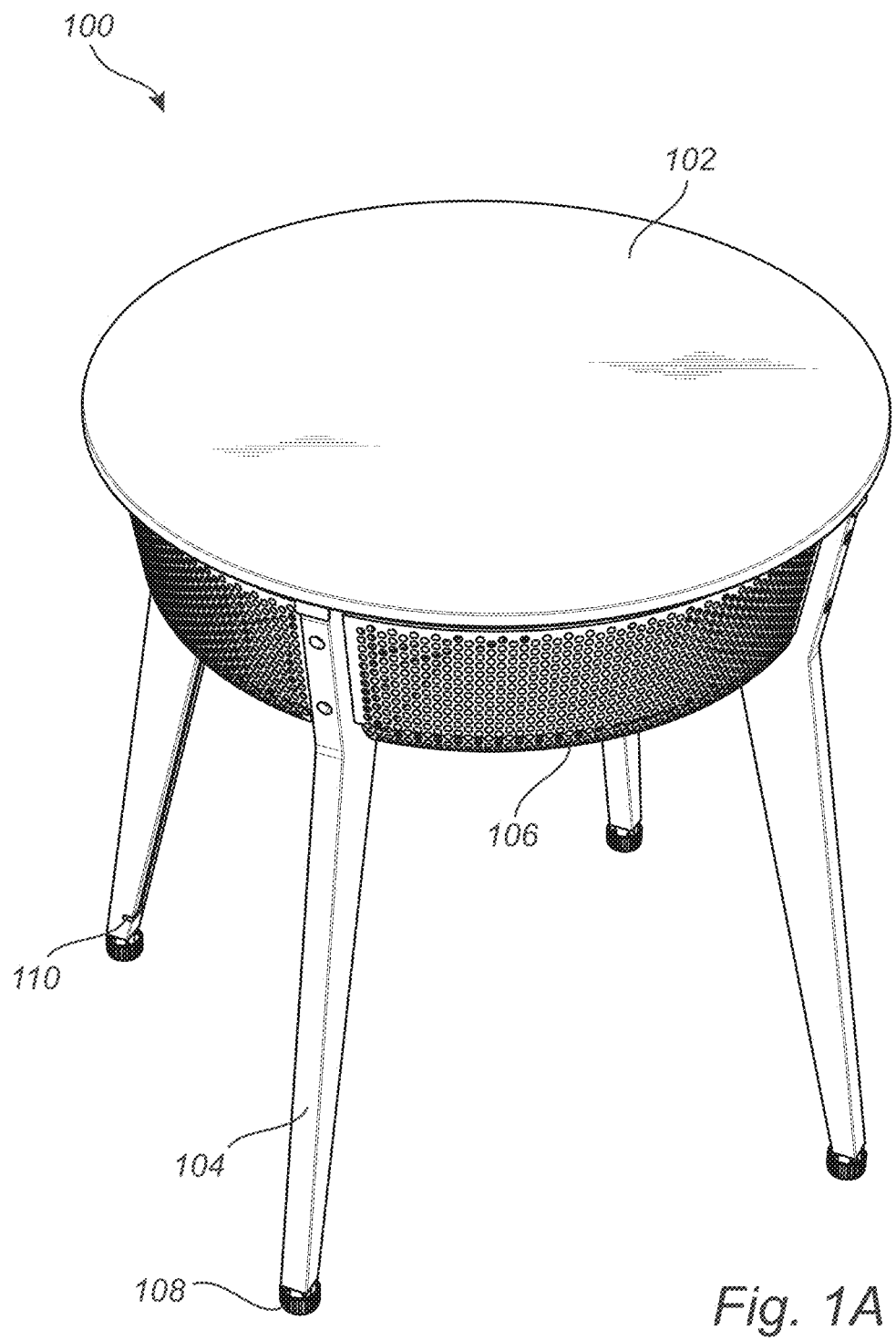
FIGS. 1A and 1B are perspectives view of an exemplary embodiment of a table according to a first aspect of the invention.

FIG. 1A illustrates an exemplary embodiment of a table 100 in a perspective view. Throughout the detailed description, the term table should be understood to also refer to a table arrangement.

In this embodiment, the table 100 comprises a table top 102, a plurality of legs 104 connectable to the table top 102, and an air purifier 106 adapted to be placed below the table top 102. The table 100 is enabled to clean the surrounding air from particles such as dust or bacteria. This can create an improved indoor climate and may be especially useful for people with allergies. In an alternative embodiment, the table 100 may further comprise means for dehumidifying the surrounding air.

Even though illustrated as a round table with four legs, the table 100 may be of any type or shape. For instance, it may have three or more legs. The table 100 may be any type of table, such as a side table, a coffee table or a dining table. Also, square or rectangular tables are possible.

The plurality of legs 104 may be provided with height adjustable feet 108, so that the table 100 can be adjusted to stand stable and in level at uneven surfaces. At least one leg may be provided with a channel 110 for incorporating a power cord of the air purifier 106.

Figure 1B:
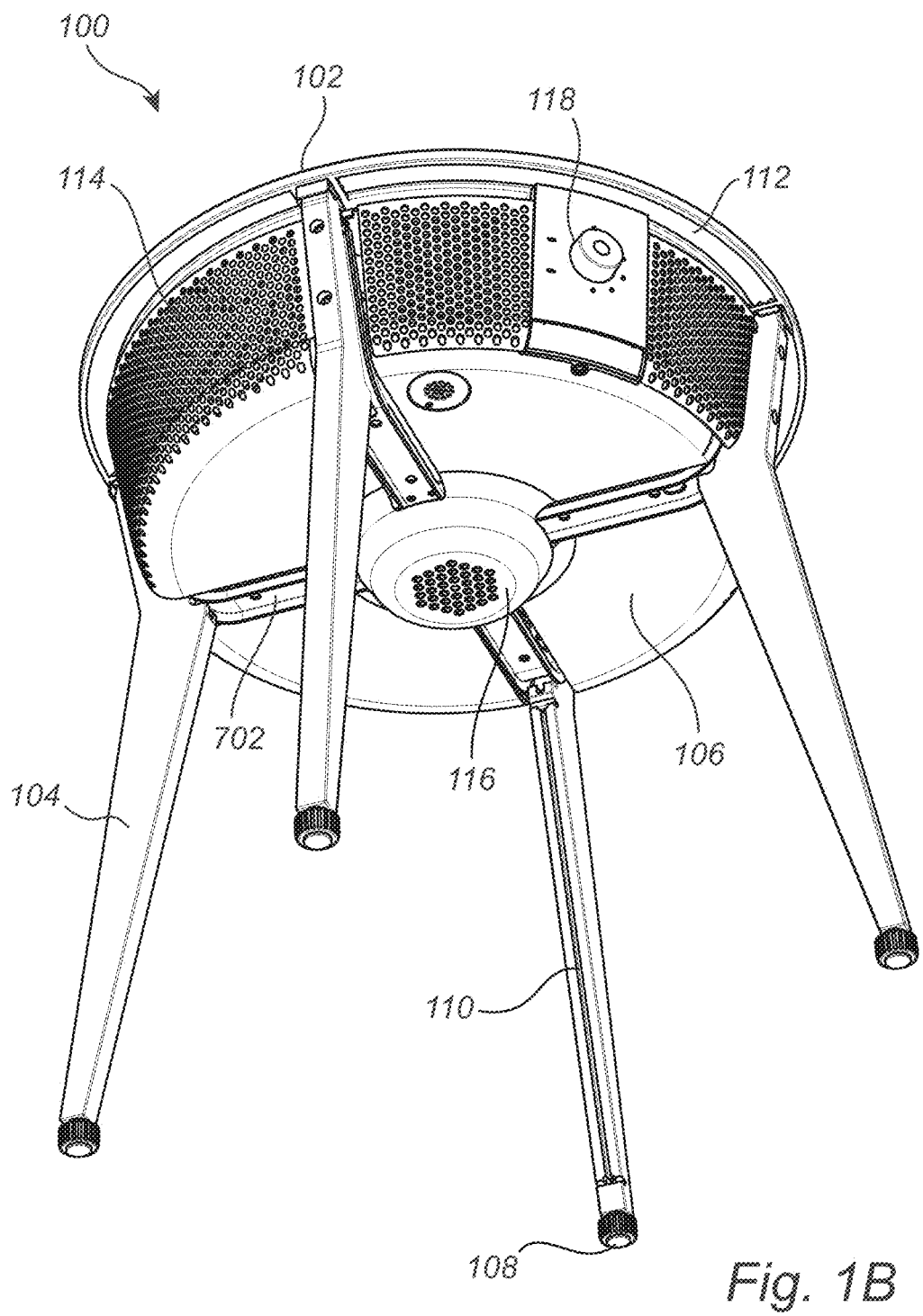

FIG. 1B illustrates the exemplary embodiment of a table 100 shown in FIG. 1A in another perspective view. A bottom side of the table top 102 may be provided with at least one groove 112 extending in a circumferential direction for preventing liquid from traveling from an outer edge of the table top 102 along the bottom side of the table top 102 and reaching an inner section of the air purifier 106. Circumferential should be understood to not be limited to circular shapes. In a non-limiting example of a square shaped table top 102, the at least one groove 112 may extend around the top 102, following the squared shape of the table top 102.

This is advantageous in that liquids will be prevented from being sucked into critical components of the air purifier 106 by means of the air flow provided by the same. Specifically, the at least one groove 112 will hinder liquids from traveling from the outer edge of the table top 102 along the bottom side thereof to reach a filter of the air purifier 106 while simultaneously not lowering the air flow rate or increasing any sound caused by the air flow. It is further important that the mechanical stability of the table 100 is not substantially affected by the at least one groove 112.

The table 100 may be provided with an air inlet 604 (as further shown in FIG. 6B) between the table top 102 and the air purifier 106. The gap between the table top 102 and the air purifier 106 that represents the air inlet may be approximately 20 mm wide.

An air outlet may be provided, herein as a perforated shielding surface 114 of the air purifier 106, extending around the table 100.

The air purifier 106 should be understood to be provided with at least one air purifying filter 502 (shown in FIG. 5C), sometimes referred to as just air filter. The at least one air filter 502 may be a HEPA filter or a carbon filter. In the case of a multi filter set up, the filters may be different types of filters complementing each other. For instance, it may be a HEPA filter for removing particles, followed by a carbon filter for removing odours.

The fan preferably protrudes out of the bottom section of the table 100 in order to reduce the perceived thickness of the table 100. In this embodiment, the fan in the form of the fan motor 116 protrudes a couple of centimetres from the bottom section of the table 100 towards the ground floor in an annular manner.

The table 100 further comprises a support structure 702. The support structure 702 has a centre element 704 and a plurality of arms 706 connectable to the plurality of legs 104. The support structure 702 is further described in relation to FIG. 7A to 7C. A motor 116 of the air purifier 106 may be adapted to be attached to at least the centre element 704 of the support structure 702. The placement of the motor 116 may be such that it has minimal effect of the esthetical appearance of the table 100. It is also advantageous in that the motor 116 can be ventilated without affecting the airflow of the air purifier 106.

In this embodiment, a control unit 118, herein depicted as a control knob, is provided on the side of the air purifier 106. The control unit 118 can be used to control the motor 116 and thereby the speed of the fan 710 in the air purifier 106. By turning the control knob, the speed of the fan 710 can be adjusted. In other embodiments, the control unit 118 may be for instance a number of buttons, a touch panel or other means suitable for controlling an air purifier. The control unit 118 can, in other embodiments, be placed on an under side of the air purifier 106, on any one of the plurality of legs 104, on the table top 102, behind either a left 708a or right 708b front panel, advantageously in a place easily accessible of a user. Control units 118 may also be provided under the table top 102.

The air purifier 106 may also be controlled wirelessly, for instance by a remote control or by a mobile device, such as a smartphone. The table 100 may be connected to a smart home environment, such as IKEA Home Smart. In a smart home environment, the air purifier 106 can be connected to a smart home gateway or hub, for instance over the Zigbee protocol. The gateway can allow the air purifier 106 to interact with other devices of the smart home environment and be part of routines or scheduling. As an example, the air purifier 106 may be configured to turn on or off or change speed of the fan based on if the lights in the room is turned on or off. Or it could be scheduled to run on certain speeds during different times of the day.

Figure 2A:
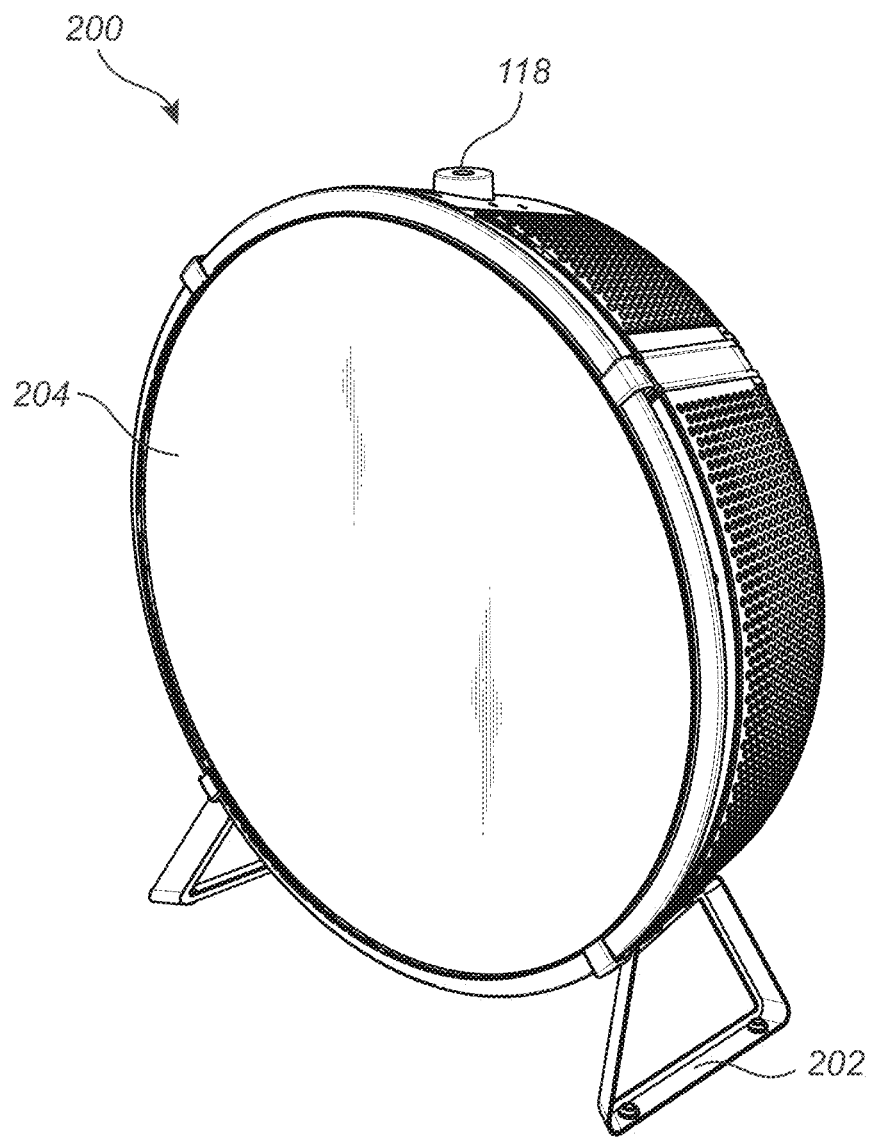
FIGS. 2A and 2B are perspectives view of an exemplary embodiment of a stand-alone air purifier according to a further aspect of the invention.

FIG. 2A is a front side perspective view of an exemplary embodiment of a stand-alone air purifier 200. The stand-alone air purifier 200 may have the same features and advantages as the air purifier 106 described in connection to FIGS. 1A and 1B.

In this embodiment, the air purifier 200 is provided with two legs 202, allowing the air purifier 200 to stand in an upright position. This is advantageous in that the air purifier 200 requires less space. In an alternative embodiment, the air purifier 200 may be provided with a wall mount such that the air purifier 200 can be mounted to a wall.

In the case of an upright stand-alone air purifier 200, the top of the air purifier 204 may be exploited for additional use cases. The surface of the top 204 of the air purifier could for instance be covered by a mirror such that the stand-alone air purifier 200 can function as a mirror as well. Alternatively, the surface could be a chalk board or be used as a notice board.

Figure 2B:
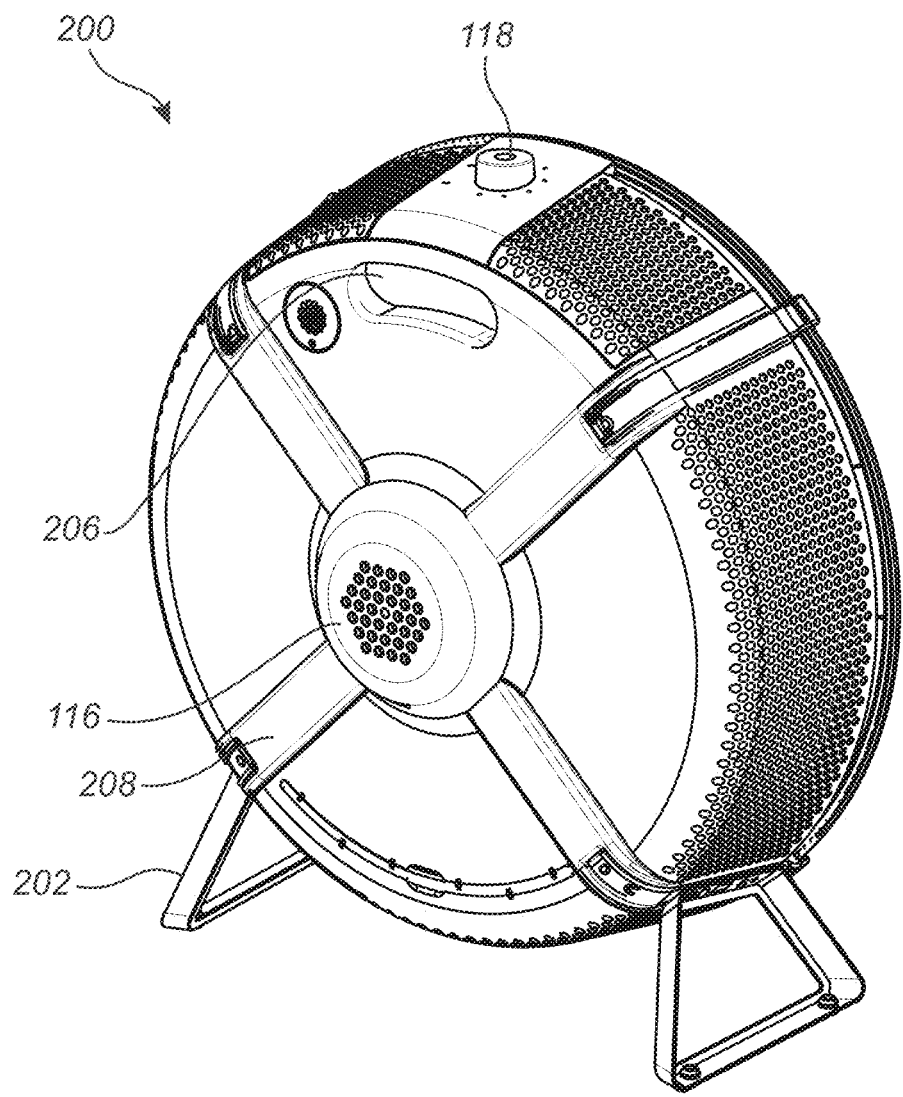

FIG. 2B illustrates the stand-alone air purifier 200 of FIG. 2A from a backside perspective. Herein the air purifier 200 is provided with an integrated handle 206 for easy moving of the air purifier 200.

The supporting structure 208 of the stand-alone air purifier 200 may be such that the stand-alone air purifier 200 can be part of a table, such as the table 100 described in connection to FIGS. 1A and 1B. This may be advantageous in that it provides a versatile use of the stand-alone air purifier 200.

Figure 3A:
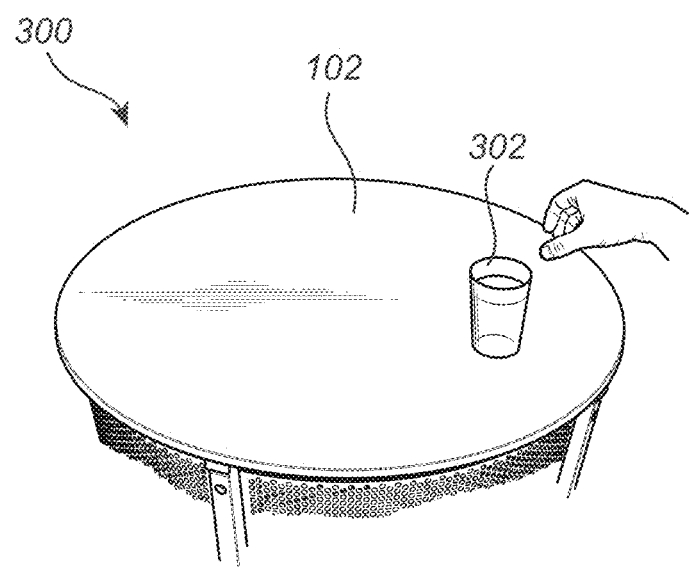
FIGS. 3A and 3B are perspectives view of the exemplary embodiment of the table according to the first aspect of the invention.

FIG. 3A is a perspective view of the exemplary embodiment of the table 100 provided with the air purifier 106. Herein an upper part 300 of the table 100 is illustrated with a glass of liquid 302 on the table top 102.

Figure 3B:
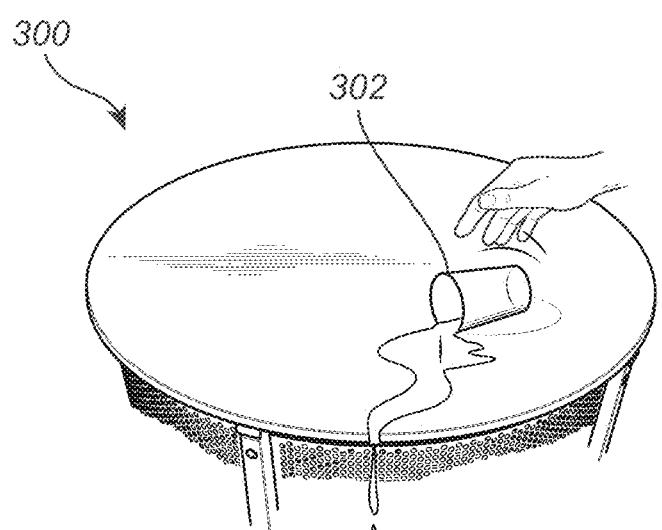

FIG. 3B is another perspective view of the exemplary embodiment shown in FIG. 3A, herein illustrated with the glass of liquid 302 knocked over. FIGS. 3A and 3B illustrates a cause for a problem with having an air purifier 106 underneath a table top 102. If a liquid is spilled on the table top 102, there is a risk of the liquid flowing over the edge of the table top 102 and being sucked into the air purifier 106. This could cause damage to the air filter 502 or reduce its effect. A solution to this problem is described in relation to FIGS. 6A and 6B.

Figure 4:
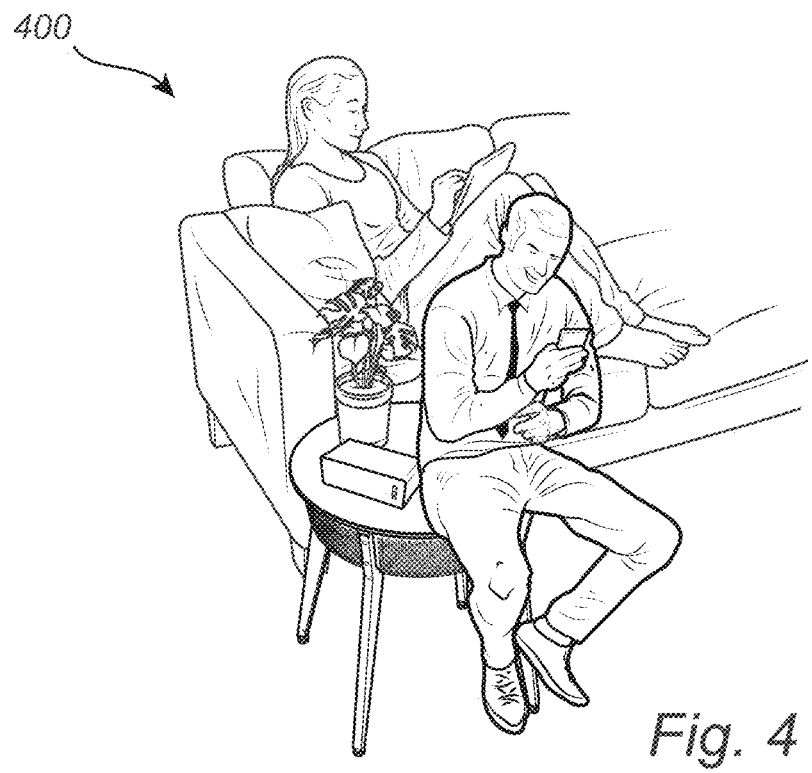
FIG. 4 is a perspective view of the exemplary embodiment of the table according to the first aspect of the invention.
Figure 7A:
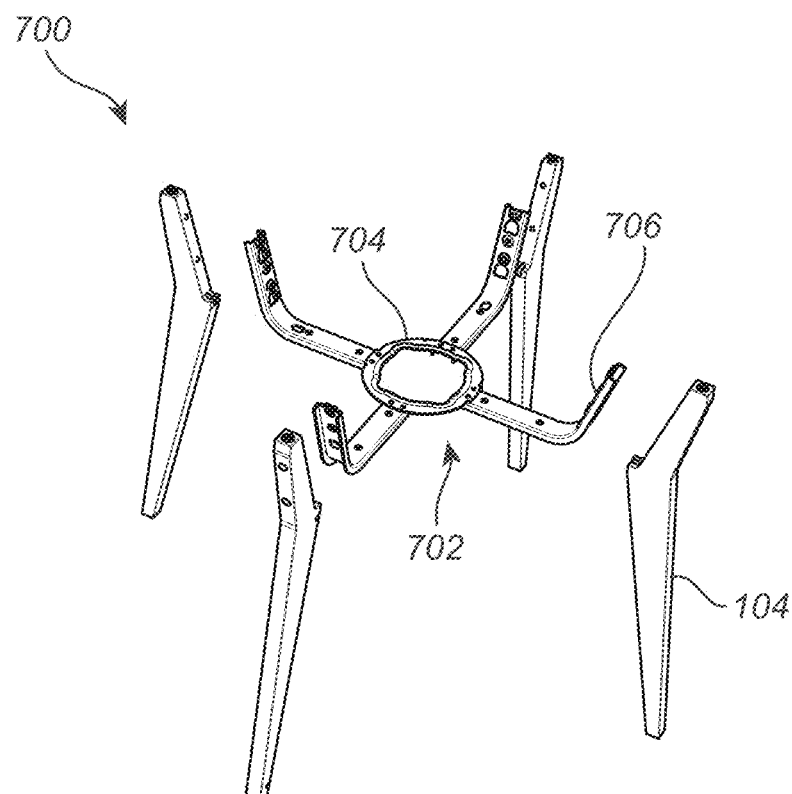
FIG. 7A to 7C are perspectives view of the exemplary embodiment of the table according to the first aspect of the invention.
Figure 7B:
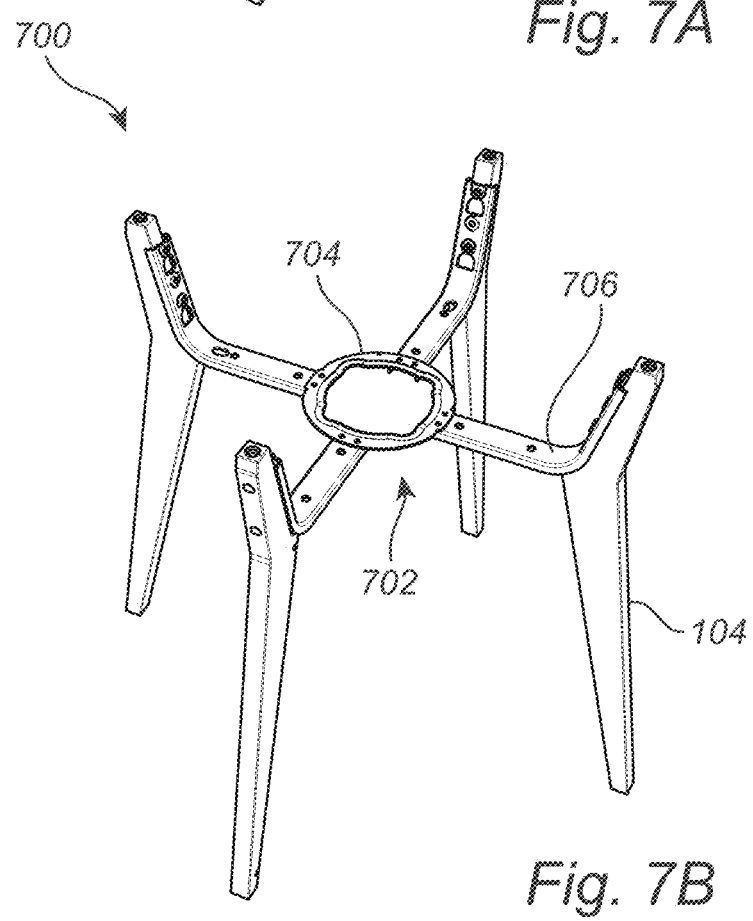
Figure 7C:
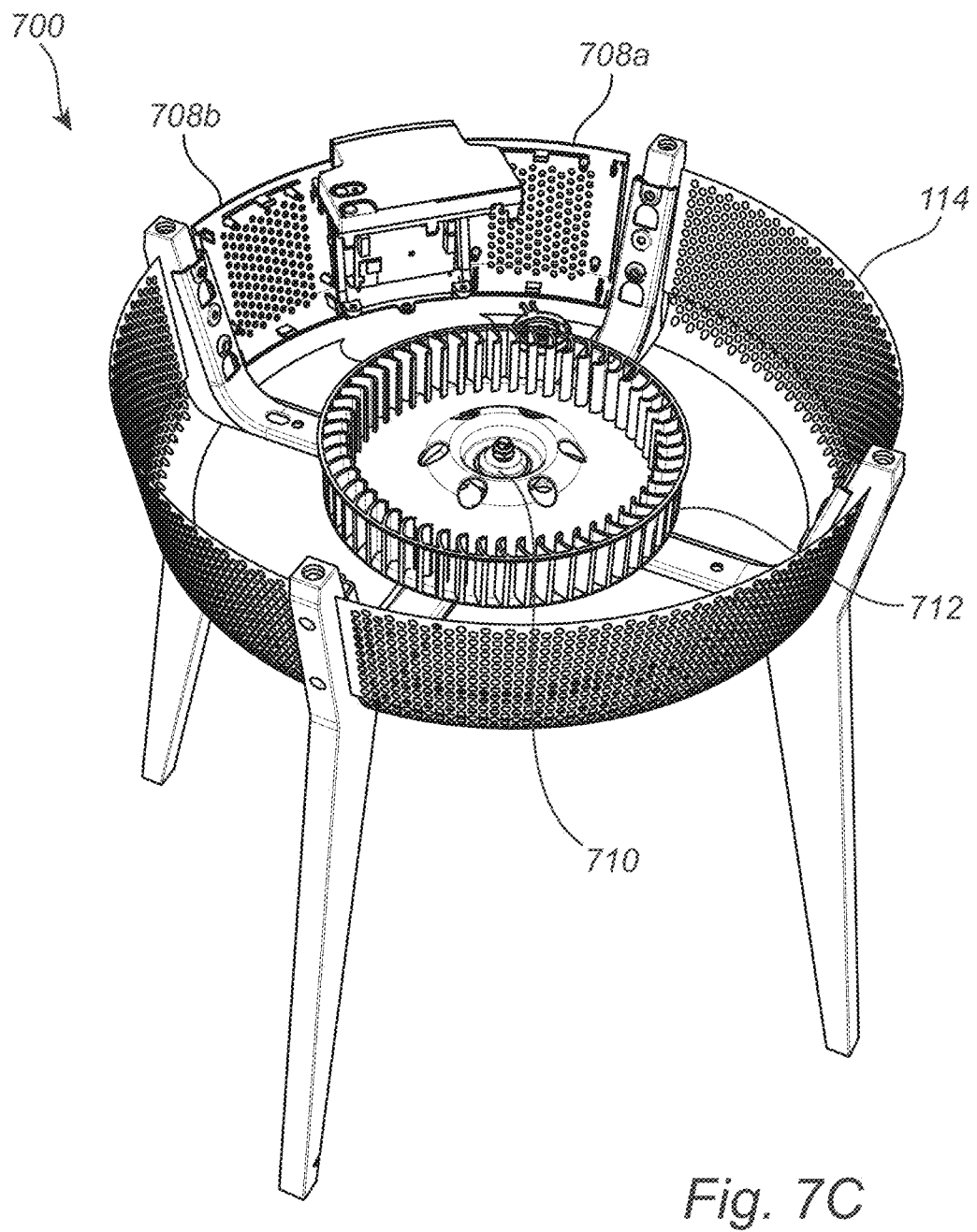

FIG. 4 is a perspective view of the exemplary embodiment of a table with an air purifier. An advantage of having a table 100 provided with an air purifier 106 may be that it can be placed centrally in a room which improves the effectiveness of the air purifier 106, without affecting the aesthetical aspect of the environment. Further, the arrangement of the legs 104 of the table base 700 described in connection to FIG. 7A to 7C, provides enough stability for a person to sit on the table 100, as illustrates herein. The table 100 may withstand a person of up to 100 kg.

Figure 5A:
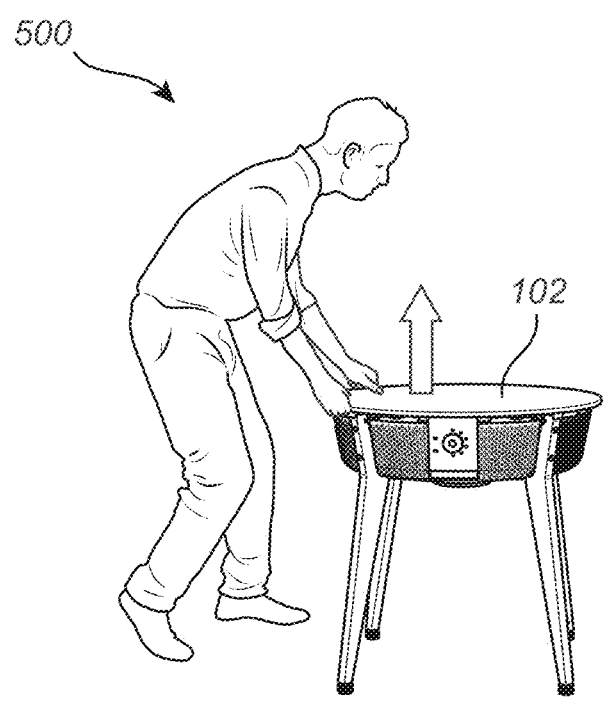
FIG. 5A to 5E are sequence views on how to access a filter of an air purifier provided in the table according to the first aspect of the invention.
Figure 5B:
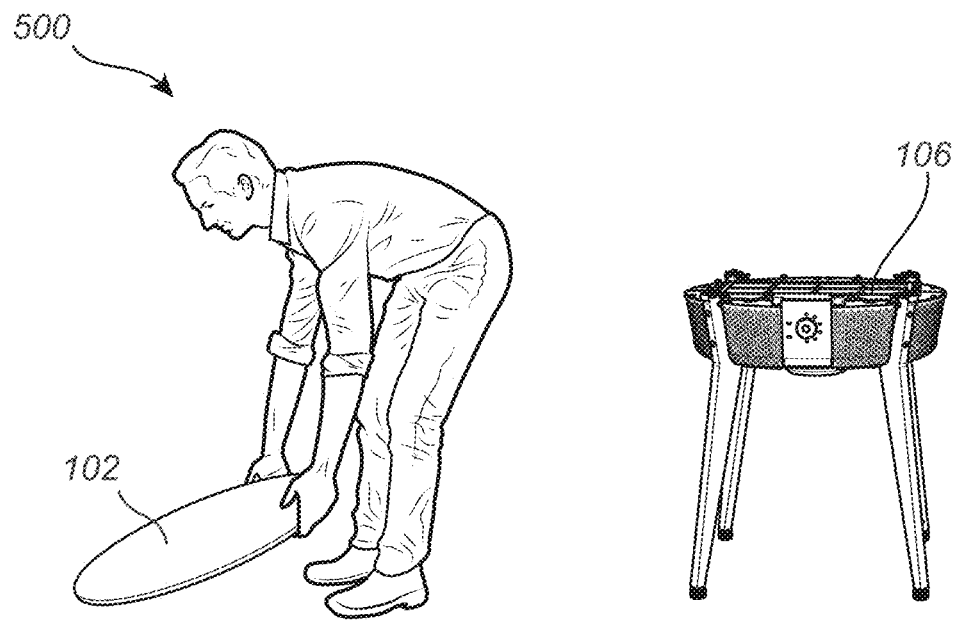
Figure 5C:
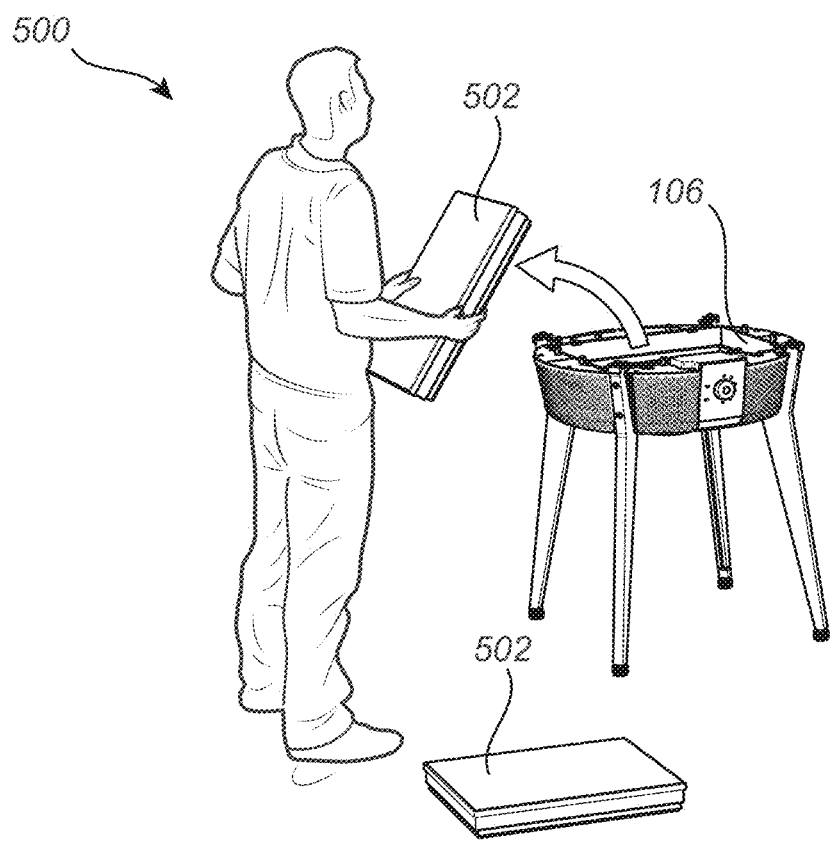
Figure 5D:
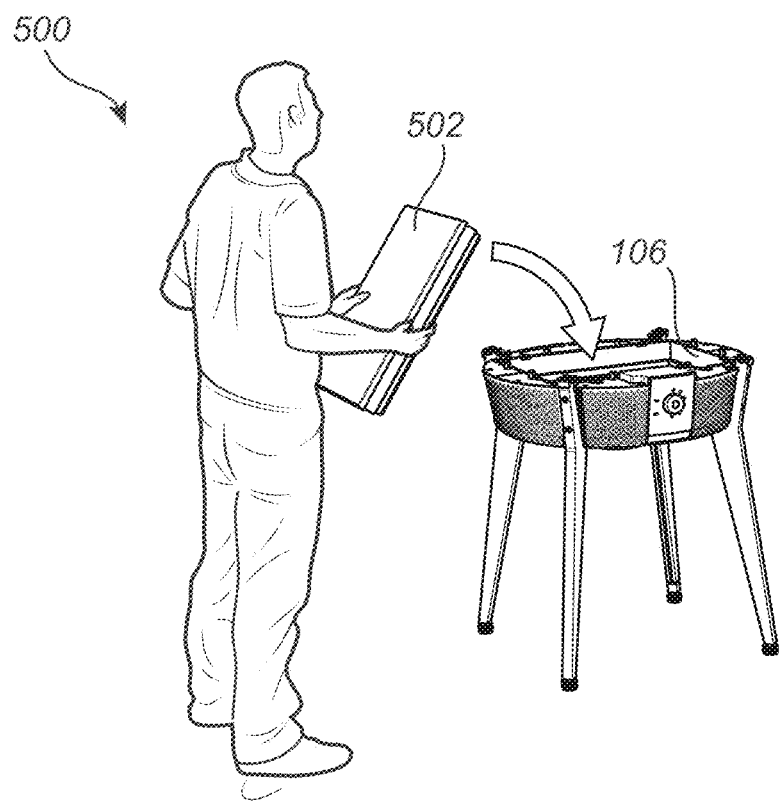
Figure 5E:
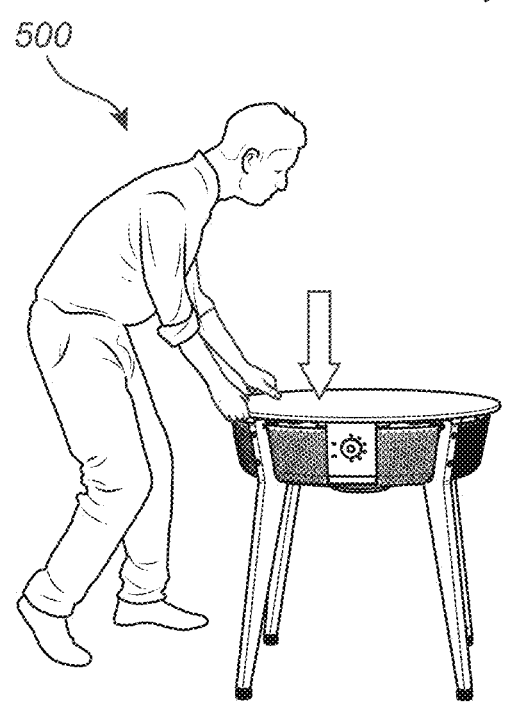

FIG. 5A to 5E are sequential views of how to access a filter 502 of the air purifier 106 provided in the table 100. In this embodiment, the air filter 502 is removed from the top. FIGS. 5A and 5B shows how in a first step, the table top 102 is removed. FIG. 5C shows how the air filter 502 is removed from the air purifier 106. In FIG. 5D, a new air filter 502 is placed in the table 100. Finally, in FIG. 5E, the table top 102 is put back on the table 100. The arrangement of the air purifier 106 and a removable table top 102 allows for easy access of the air filter 502, and service of other parts of the air purifier 106. The easy removal of the table top 102 can be achieved by use of one or more table top locks 800, as described in connection to FIG. 8A to 8D. The air purifier 106 may be provided with a hatch for filter service. Furthermore, the table top 102 can easily be exchanged if it is damaged or if a different colour or material is wanted.

Figure 6A:
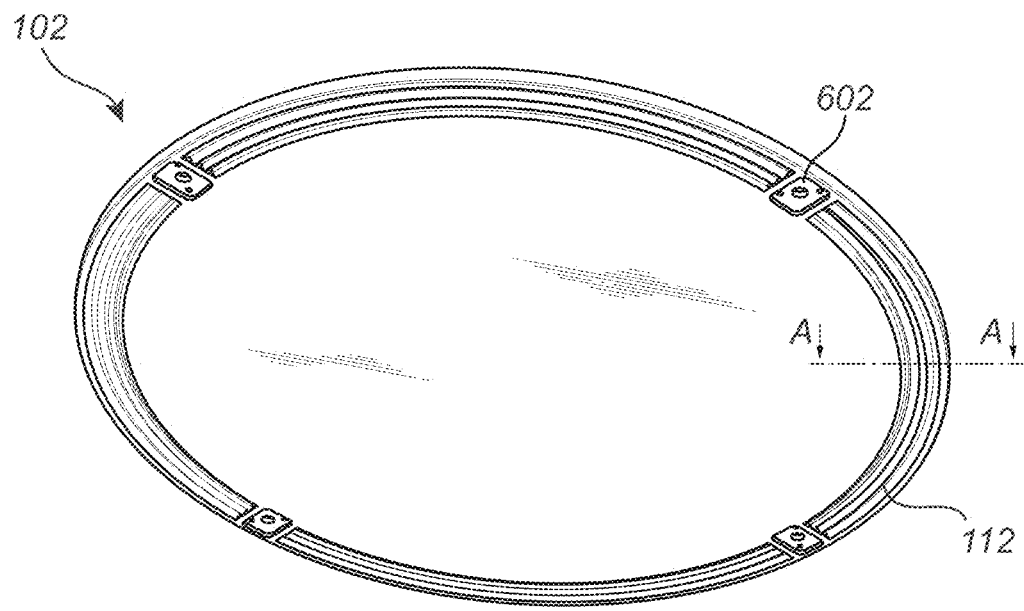
FIGS. 6A and 6B are perspectives view of the exemplary embodiment of the table according to the first aspect of the invention.

FIG. 6A is a perspective view of the bottom side of the table top 102 of the table 100 with the air purifier 106. The table top 102 may have a circular shape as in the present embodiment, although other shapes are possible, such as square, rectangular, elliptical or a combination of multiple shapes. The disclosed embodiment of the table top 102 is arranged to prevent liquid from traveling from an outer edge of the table top along the bottom side of the table top 102 and reaching an inner section of the air purifier 106. The bottom side of the table top 102 may be lacquered for withstanding moisture.

The table top 102 is provided with four attachment points 602 arranged symmetrically around the table top 102 such that they line up with corresponding attachment points on the table base 700. The attachment points 602 of the table top 102 are hence used for connecting the table top 102 to the table base 700. Preferably, the attachment points 602 of the table top 102 are placed with a maximum distance possible between each other for maximum stability of the table 100.

Further, the attachment points 602 of the table top 102 may be arranged to hold an upper attachment member 804 of a table top lock 800, further described in connection to FIG. 8A to 8D.

As illustrated in this embodiment, the table top 102 may be provided with three separate grooves 112, subsequently provided in a direction towards a centre of the table top 102, although any number of grooves extending in a circumferential direction are possible, in other words at least one groove. In this illustration, the grooves 112 extend around the edge of the table top 102, apart from where the attachment points 602 of the table top 102 are provided. In alternative embodiments, the grooves 112 may be provided continuously around the table top 102, with the attachment points 602 provided either outside or inside of the grooves 112.

In a preferred embodiment, the grooves 112 are provided in a shape extending outside of the air purifier 106. More specifically, the grooves 112 are not limited to follow the shape of the table top 102. In an example, the table top 102 may be square shaped while the air purifier 106 is circular. The grooves 112 may then follow a circular shape on the bottom side of the table top 102, with a diameter at least larger than the inner section of the air purifier 106.

The at least one groove 112 may have a cornered cross section, e.g. in the shape of a polygon. Alternatively, the at least one groove 112 may have a rounded cross section, e.g. in a wavy shape or sinusoidal shape. The at least one groove 112 may be provided in an outer periphery of the bottom side of the table top 102. Put differently, the at least one groove 112 may be provided around the bottom side of the table top 102, close to the edge. The at least one groove 112 may interrupt a flow of liquid such that the liquid collects at the at least one groove 112 and eventually drips down, as illustrated in FIG. 6B.

The at least one groove 112 may have a depth of approximately 3 mm. The at least one groove 112 may be provided on the bottom side of the table top 102 at a distance of between 5 and 15 mm from an outer edge of the table top 102. Having the at least one groove 112 provided at such a distance from the outer edge is advantageous in that the at least one groove 112 is not visible to a person standing beside the table 100, hence the aesthetics of the table 100 is not affected. In the case of three grooves as illustrated, the total width of the grooves may be approximately 20 mm.

Figure 6B:
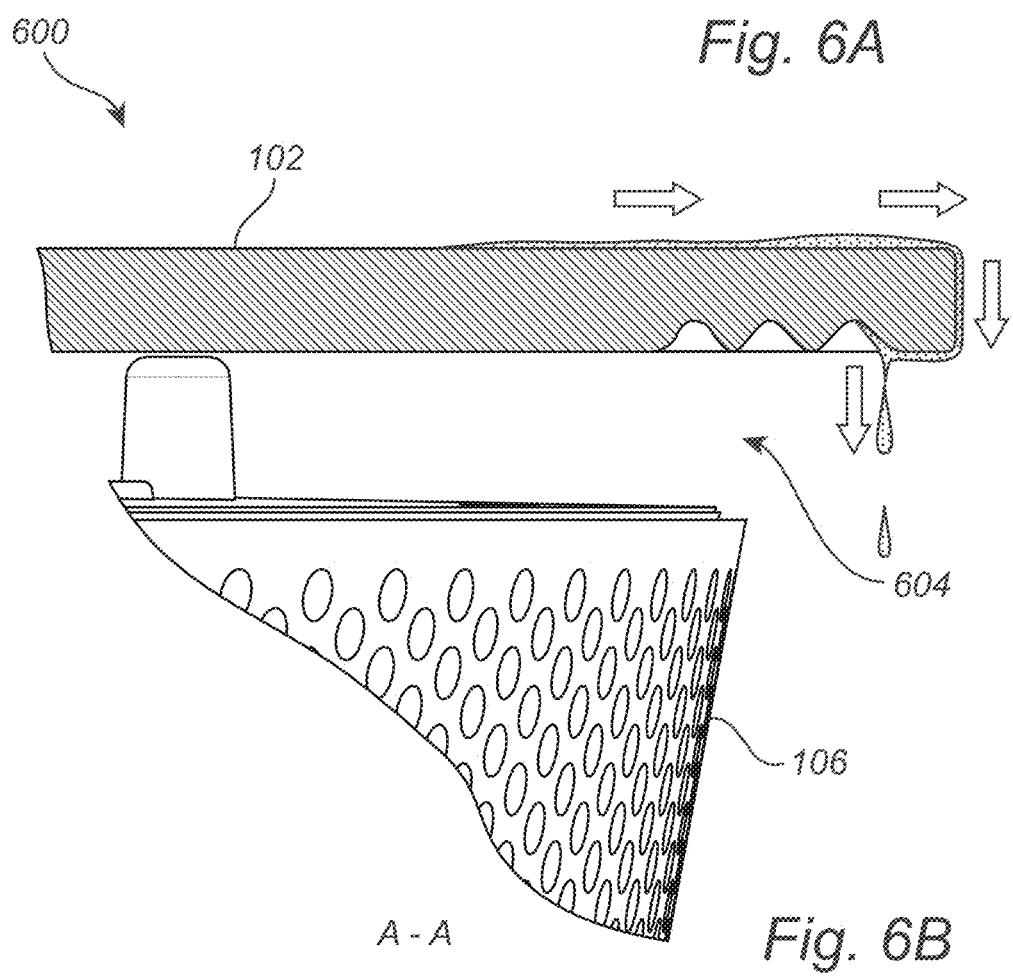

FIG. 6B is a perspective view 600 of the exemplary embodiment of the table 100 with air purifier 106, illustrating the effects of having a table top 102 as described in connection to FIG. 6A. More specifically, it illustrates what happens when a liquid is spilled on top of the table top 102. Arrows are provided to illustrate the flow direction of the liquid. When the liquid is spilled on the table top 102, it may flow to an edge of the table top 102. Naturally, the liquid continues to flow down the edge of the table top 102 and eventually, due to the surface tension, the liquid may continue around the edge to the bottom side of the table top 102. Having an air inlet 604 under the table top 102 may cause the liquid to continue to flow on the bottom side of the table top 102, and eventually be sucked into the inner section of the air purifier 106. However, providing a table top 102 according to the disclosed embodiment, can hinder the flow of liquid without substantially affecting the air flow (as the case would be if a flange placed on the lower side of the table and extending downwards in a horizontal direction would be used to stop fluid). The liquid collects at the at least one groove 112. If a sufficiently large amount of liquid is collected it drips down at the position of the at least one groove 112. Hence, the placement of the at least one groove 112 should be understood as being at a position where the liquid can drip down without damaging or in any other way affect the air purifier 106.

FIG. 7A illustrates a part of the exemplary embodiment of the table 100 having an air purifier 106. Illustrated is a support structure 702 and four legs 104. The support structure 702 has a centre element 704 and a plurality of arms 706. The number of arms 706 is the same as the number of legs 104, hence this number may vary in the same way as the number of legs. The centre element 704 of the support structure 702 may be ring shaped as herein illustrated and adapted to hold the motor 116 of the air purifier 106. The motor 116 can be adapted to protrude downwardly below the centre element 704 or the support structure 702 when held therein. A rubber gasket or any other dampening material may be adapted to be placed between the centre element 704 of the support structure 702 and the motor 116 of the air purifier 106 to reduce vibrations. The arms 706 of the support structure 702 are bent so that a first part of the arm 706 may be attached to the centre element 704 and form a level surface with the centre element 704, and a second part may be attached in an angle of an attachment section of a leg 104. The centre element 704 and the plurality of arms 706 is provided with attachment points, e.g. holes for bolts or screws, for attaching an attachment section of a shielding surface 114 of the air purifier 106. Any dampening element such as the above mentioned rubber gasket may be placed in connection with the holes to be fixated between the centre element 704 and the motor 116 by the bolts or screws. Furthermore, the end of the first part of the plurality of legs 104 is connected to the centre element 704 in a radial direction and evenly distributed around the centre element 704.

Each of the plurality of legs 104, herein illustrates as four legs, are provided with a number of attachment points, for example two per leg, for attaching the legs 104 to the arms 706 of the support structure 702. Each leg 104 is further provided with an attachment point for connecting the table top 102 to the legs 104. For increased stability, each of the plurality of legs 104 may comprise a support shoulder adapted to receive a portion of a shielding surface 114 of the air purifier 106 and/or the support structure 702.

FIG. 7B illustrates the plurality of legs 104 connected to the support structure 702. The support structure 702 and the air purifier 106 are adapted such that the air purifier 106 can be attached to the centre element 704 and the plurality of arms 706 of the support structure 702. When attached, the plurality of legs 104 and support structure 702 can stand stably, even though a table top 102 is not attached. This is later advantageous in that the table top 102 can be removed when performing service or other work on the air purifier 106 without causing the table 100 to fall apart.

Preferably, the plurality of legs 104 may be made from wood or metal. The support structure 702 may be made from metal such as a sheet metal.

FIG. 7C illustrates, in addition to the plurality of legs 104 connected to the support structure 702 as shown in FIG. 7B also the shielding surface 114 of the air purifier 106 having at least one attachment section and at least one perforated section, forming a table base 700. The shielding surface 114 forms an enclosed space between the legs 104 of the table 100 such that the air that is sucked through the air filter 502 exits the shielding surface 114 through the perforated section. In this embodiment, the shielding surface 114 is perforated all the way around the table 100. This may be advantageously in that the purified air can exit the air purifier 106 in any direction. In this embodiment, the perforated section comprises of a plurality of circular holes in a symmetrical pattern. In alternative embodiments, the shielding surface may be perforated in other patterns and with holes in other shapes or sizes. The perforated section should be understood to be characterized in that it allows the clean air from the air purifier 106 exit the air purifier 106 in an efficient way, preferably in accordance to the aesthetic looks of the table. As another non-limiting example, the shielding surface 114 may be provided with an air outlet on the bottom side. In such a case, the air outlets may be larger openings since they are not visible when the table 100 is put on a floor.

Attached to the shielding surface 114 is a left 708a and a right 708b front panel. The left 708a and right 708b front panel may be removed to access parts of the air purifier 106. The at least one attachment section is adapted to be fastened between the plurality of legs 104 of the table 100 and the plurality of arms 706 of the support structure 702.

Further illustrates is a drive shaft 710 of the fan motor 116 attached to the centre element 704 of the support structure 702. Attached to the drive shaft 710 is the fan 712, herein illustrates as a circular fan pushing air in a radial direction.

Figure 8A:
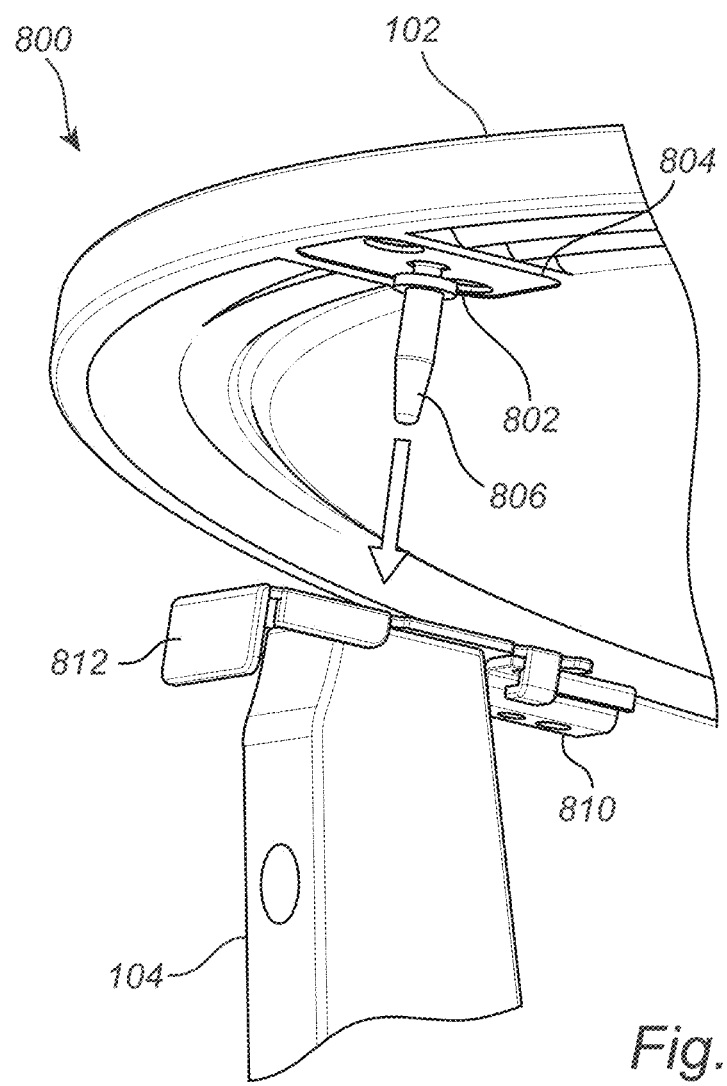
FIG. 8A to 8D are perspectives view of an exemplary embodiment of a table top lock according to a further aspect of the invention.

FIG. 8A illustrates, in perspective view, an exemplary embodiment of a table top lock 800 provided between the table top 102 and a leg of the table 104. The table top lock 800 comprises an upper device 802, wherein the upper device 802 comprises an upper attachment member 804 arranged to be attached to an attachment point 602 on the bottom side of the table top 102, and a protruding member 806 provided with a flange 816, attached to the attachment member 804. Put differently, the protruding member 806 may comprise a cylindrical element. Preferably, the upper device 802 is arranged such that the protruding member 806 is perpendicular to the bottom side of the table top 102. The end of the protruding member 806 that points away from the table top 102 may be tapered to easily be inserted into a hole in the leg 104 of the table 100. Put differently, a tip of the protruding member 806 may have a bevelled edge.

The table top lock 800 further comprises a lower attachment member 810 arranged to be attached to the table base 700, herein to the top of a leg 104. The table top lock 800 further comprises a sliding member 812 slidably attached to the lower attachment member 810 so that the sliding member 812 can be moved in a radial direction of the table top 102 on a plane parallel to the table top 102. The sliding member 812 is provided with an opening 814, and movable between an unlocked position and a locked position. The sliding member 812 may be provided with a handle or any other suitable means for operating the lock. In the exemplary embodiment of FIG. 8A this is illustrated as a plate provided in an angle from a sliding direction of the slidable member 812, which can be easily operated with a hand.

Figure 8B:
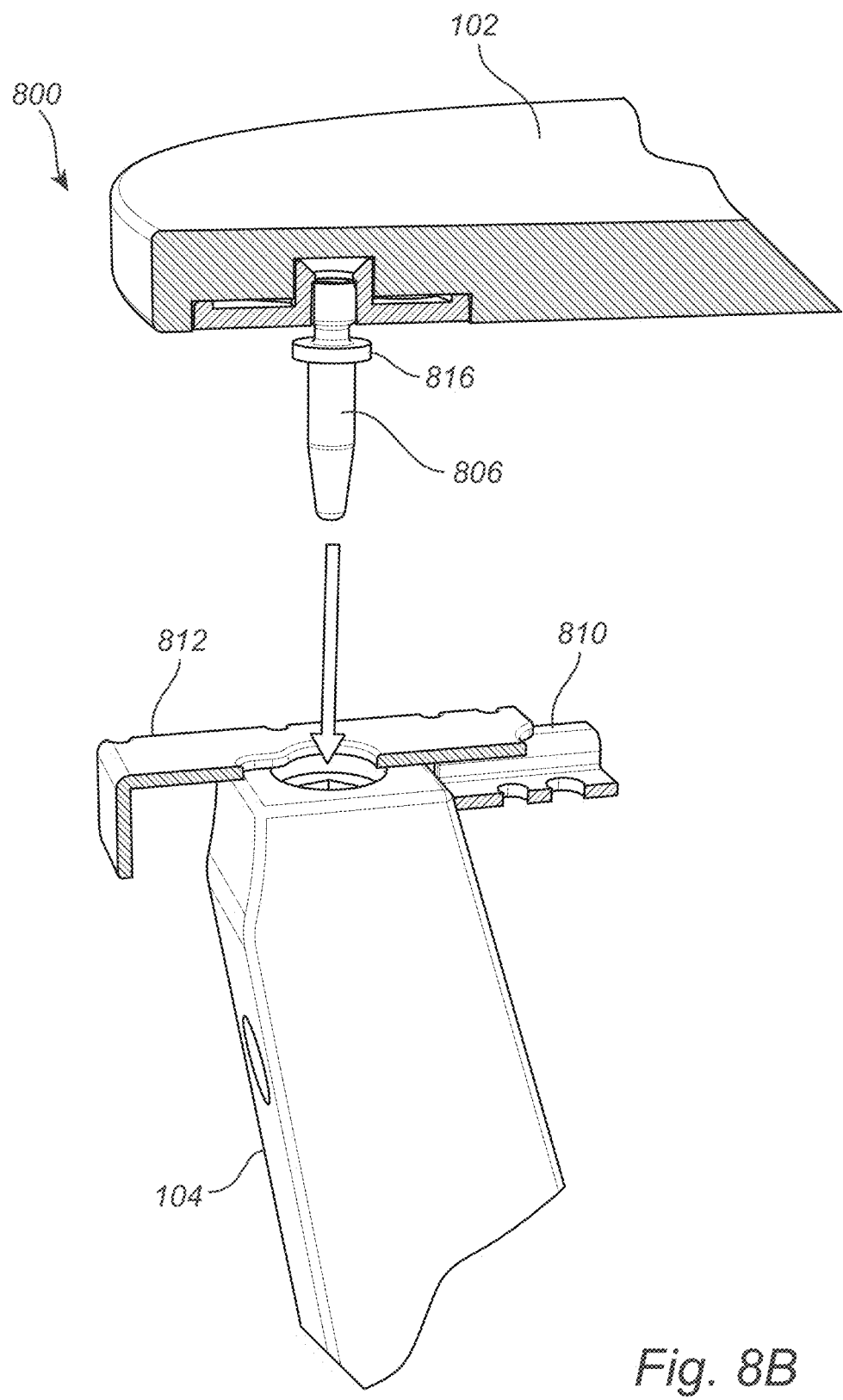

FIG. 8B illustrates the table top lock 800 of FIG. 8A, in a cross-sectional view. The table top lock 800 is illustrated in an unlocked position. In the unlocked position, a wide section of the opening 814 is facing the protruding member 806, thereby allowing the flange of the protruding member 806 to pass the sliding member 812. More specifically, the wide section of the opening 814 is larger than the flange 816.

Figure 8C:
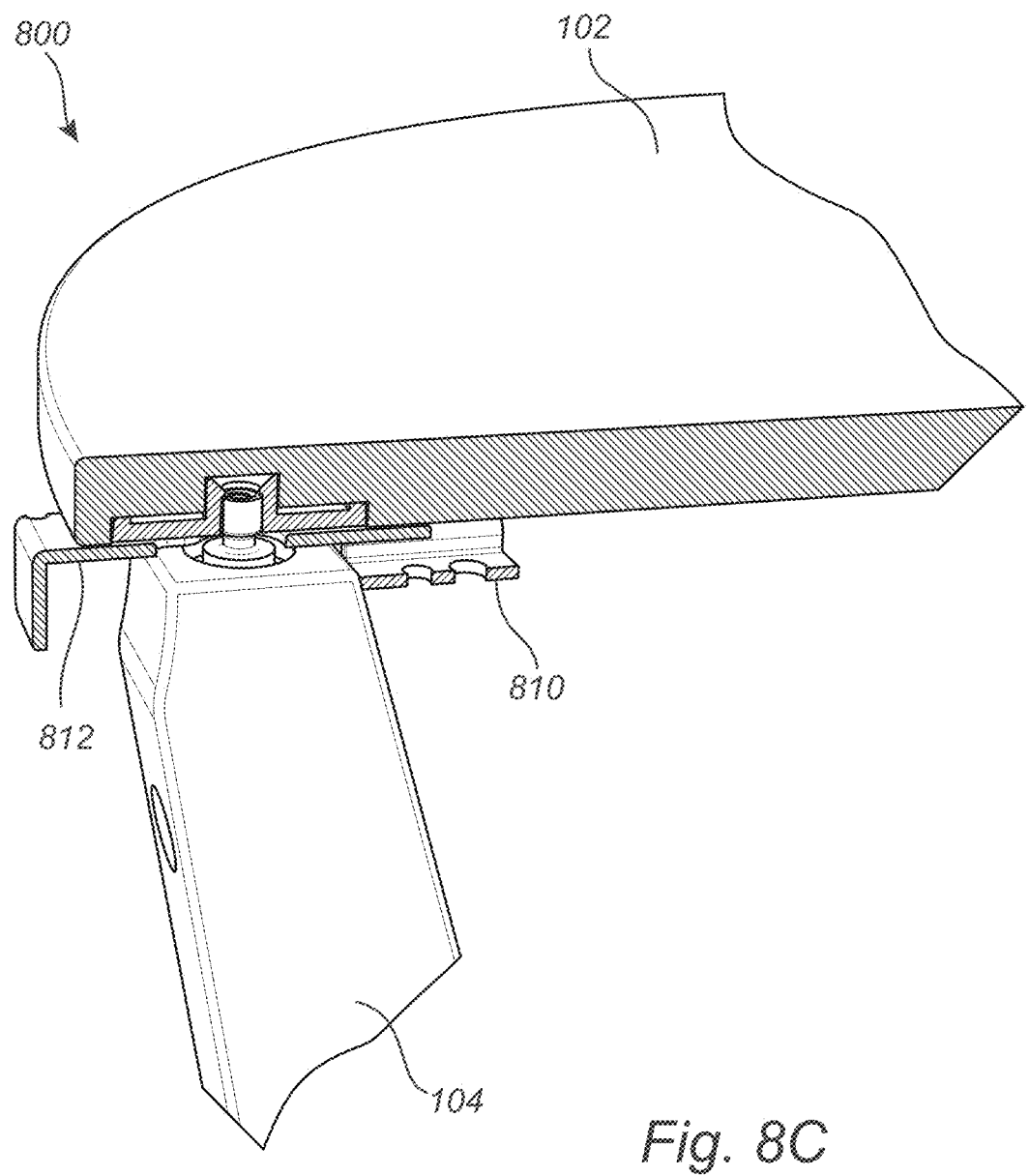

FIG. 8C illustrates the same cross-sectional view of the table top lock 800 as in FIG. 8B but with the table top 102 placed in position on the table base 700. The protruding member 806 has been inserted into the table base 700 and the table top lock 800 is still in the unlocked position. In this position, the sliding member 812 is adapted to protrude outside edge of table top.

Figure 8D:
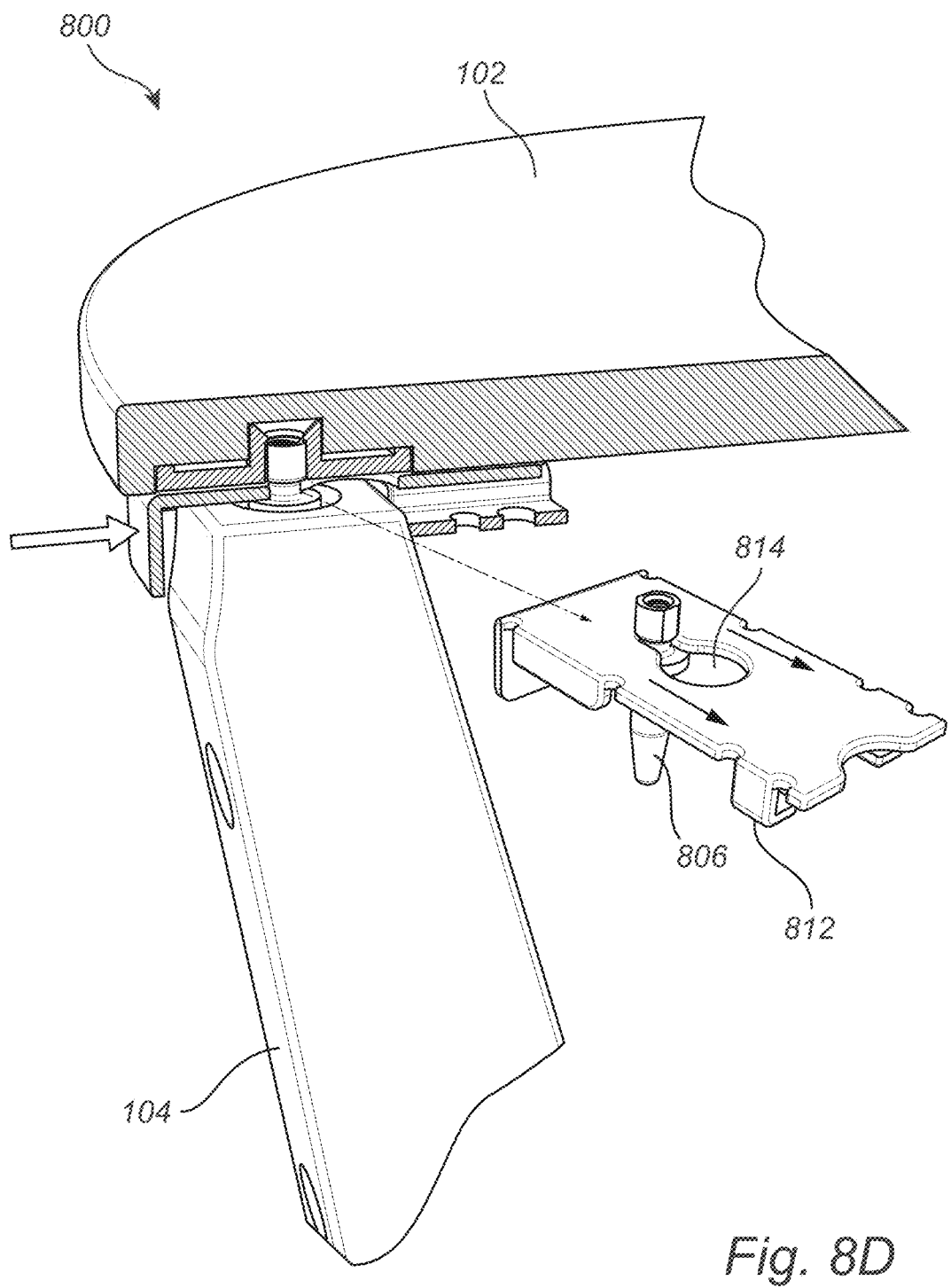

FIG. 8D illustrates the same cross-sectional view of the table top lock 800 as in FIG. 8C but with the table top lock 800 in a locked position. In the locked position, a narrow section of the opening 814 is facing the protruding member 806, thereby preventing the flange 816 of the protruding member 806 to pass the sliding member 812. More specifically, the narrow section of the opening 814 is smaller than the flange 816 so that the protruding member 806 is held in place. To move the table top lock 800 between the unlocked position and the locked position the sliding member 812 may be pushed or pulled in a direction towards the centre of the table 100. In an alternative embodiment of the table top lock 800, the transition between the locked and unlocked position may be made by rotating the sliding member 812 so that the opening 814 is transitioned from the wide to the narrow section.

Referring back FIG. 5A to 5E where the process for exchanging the air filter 502 is shown, the table top lock 800 as exemplified in connection to FIG. 8A to 8D may be operated as follows. Prior to removing the table top 102, the sliding members 812 of the table top locks 800 are moved into the unlocked position by pulling out the handle of the sliding member 812. After the table top 102 is removed, the table top locks 800 remain in their unlocked position due to friction between the sliding member 812 and the lower attachment member 810. This is also advantageous in the step of removing the table top 102, since the person removing the table top 102 has both hands free for doing so. When the table top 102 is to be put back on the table base 700, the protruding members 806 of the table top lock 800 can be inserted into the locks without adjusting the sliding member 812. When the table top 102 is in place, the sliding member 812 can be push into the locked position. The locks 800 remains in the locked position, again due to friction.

According to embodiments, a method for locking a table top 102 to a table base 700 using a table top lock 800 described in conjunction with FIG. 8A to 8D above comprises, attaching an upper attachment member 804 of an upper device 802 to a bottom side of the table top 102, attaching a lower attachment member 810 of a lower device to the table base 700, sliding a sliding member 812 of the lower device into an unlocked position such that a wide section of an opening 814 in the sliding member 812 is facing a protruding member 806 of the upper device 802, feeding a flange 816 of the protruding member 806 through the wide section of the opening 814, and sliding the sliding member 812 of the lower device into a locked position such that a narrow section of the opening 814 is facing the protruding member 806, thereby preventing the flange 816 of the protruding member 806 to pass the sliding member 812.

To describe further embodiments in more detail reference is made to FIGS. 9 to 24.

Referring to FIGS. 9 to 14 and 21 to 22 together, an air purifier provided by the present invention will now be described. The air purifier includes: a panel 2, a wind outlet assembly 4, a wind wheel 7, an air filtering assembly 6, and a supporting assembly. The wind outlet assembly 4 includes an annular wind outlet screen 41 and a bottom plate 42 connected to one end of the annular wind outlet screen 41, the panel 2 is located at the other end of the annular wind outlet screen 41, and a wind inlet 3 for wind intake is provided between the panel 2 and the annular wind outlet screen 41. The wind wheel 7 is mounted on the bottom plate 42 and located in a cavity defined by the annular wind outlet screen 41 and the bottom plate 42. The air filtering assembly 6 is mounted in the cavity and located at an end, close to the panel 2, of the annular wind outlet screen 41, and air is driven by the wind wheel 7 to enter the wind inlet 3, filtered and purified by the air filtering assembly 6, and discharged from the annular wind outlet screen 41. The supporting assembly supports the wind outlet assembly 4 from the outside, so that the panel 2 is in a horizontal state or a vertical state. The panel 2 is fixedly connected to the supporting assembly or fixedly connected to the wind outlet assembly 4 by means of a connector 11.

Figure 11:
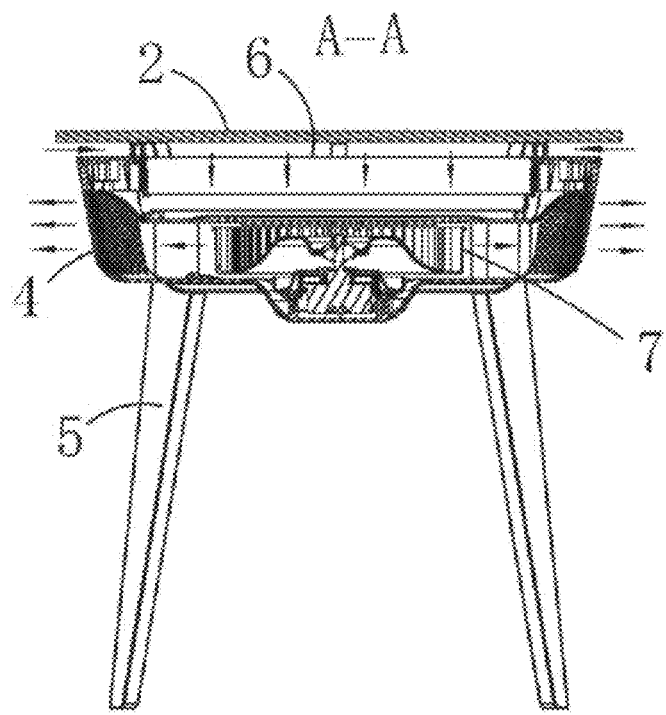
FIG. 11 is a cross-sectional structural view taken along a line A-A in FIG. 10.

Compared with the prior art, in the air purifier provided by the present invention, a gap between the panel 2 and the wind outlet assembly 4 is the wind inlet 3, the annular wind outlet screen 41 is a wind outlet, an air inlet direction and an air outlet direction are at an angle of 180° (an arrow direction shown in FIG. 11 is an air flowing direction), and the annular wind outlet screen 41 and the bottom plate 42 of the wind outlet assembly 4 directly form a cavity for mounting the wind wheel 7 and the air filtering assembly 6, so that the overall structure is compact in layout, the overall weight and the appearance size are greatly reduced, the space occupation is reduced, and the movement is convenient. Meanwhile, the panel 2, the wind outlet assembly 4, and internal components are supported by the supporting assembly. Due to light weight, small size, simple structure, and flexible and convenient movement, the air purifier can be placed on the ground or placed on a table top or a desk top and placed close to a human body, and the purification effect is improved.

Figure 9:
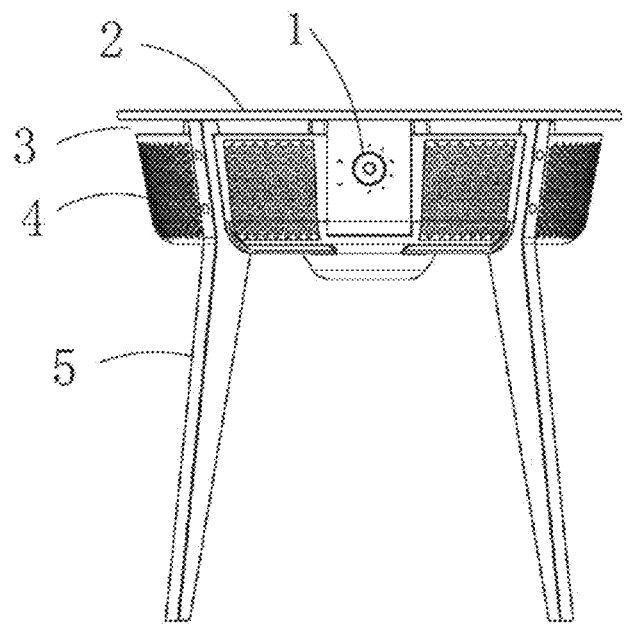
FIG. 9 is a structural view of an air purifier provided by an embodiment of the present invention.
Figure 10:
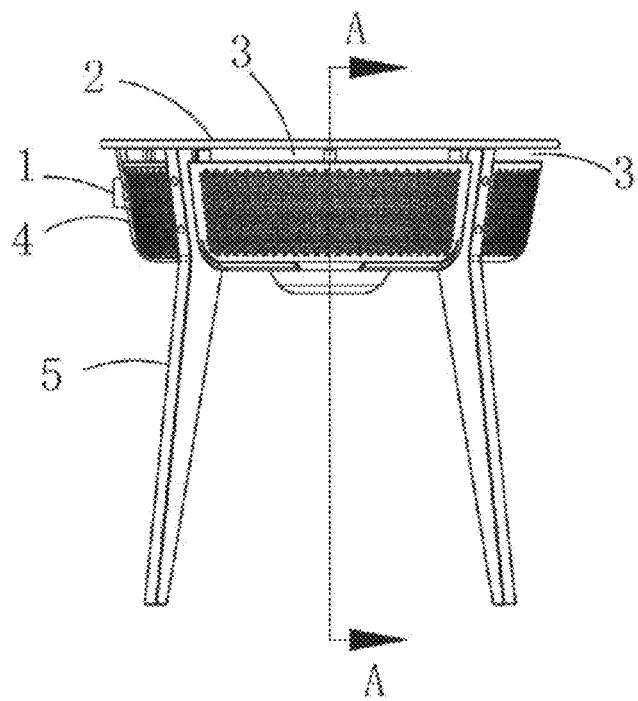
FIG. 10 is a left structural view of the air purifier provided in FIG. 9.

Referring to FIGS. 9 to 11, when the panel 2 is in a horizontal state, the air purifier is supported on the ground through the supporting assembly and can be used as a desk, articles such as materials, paper/pens, water cups, and mobile phones are placed on the panel 2 or writing is performed on the panel, and when the air purifier is placed on a desk top, the panel 2 serves as a platform on which some articles can still be placed. Meanwhile, proper articles can still be placed in the space below the wind outlet assembly 4 or on the desk top, and placing the air purifier on the desk top will not occupy excessive resources.

Figure 21:
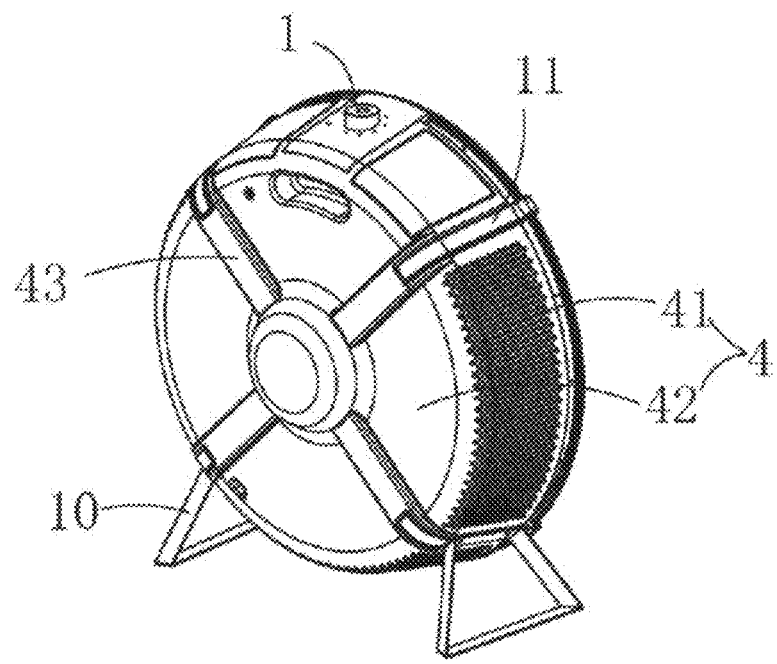
FIG. 21 is a structural view of an air purifier provided by an embodiment of the present invention.
Figure 22:
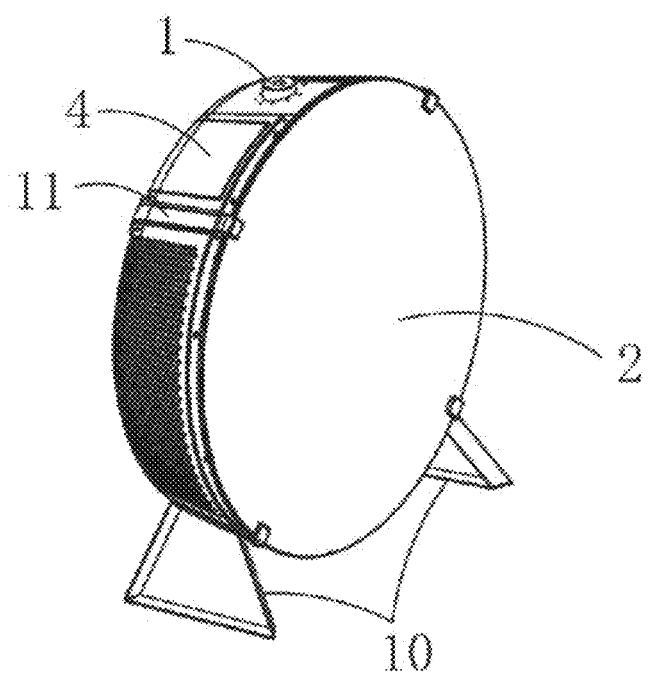
FIG. 22 is a structural view of the air purifier provided in FIG. 21 at different angles.

Referring to FIGS. 21 to 22, when the panel 2 is in a vertical state, due to small size and light weight, the air purifier can be easily placed on a table top or a desk top and placed close to a human body, and the purification effect is improved. Meanwhile, a note or a hanging ornament may be attached to the panel 2.

The present embodiment is described with respect to the panel 2 being in both vertical and horizontal states, and of course, the angle of the panel 2 may be adjusted to any position between the vertical and the horizontal direction by adjustment of the supporting assembly, i.e., the panel 2 may be adjusted in the range of 0-90° to better adapt to the layout of the environment or personal preferences.

In the present embodiment, the outline dimension of the annular wind outlet screen 41 does not protrude from the outline dimension of the panel 2. The gap between the panel 2 and the annular wind outlet screen 41 is a wind outlet, so that the wind outlet is also of an annular structure. Since the wind outlet is of an annular structure, the wind outlet is of an annular structure, the wind inlet area and the wind outlet area are large, the panel 2 and the wind outlet component 4 form a relatively thin cylindrical or conical structure, and the overall size and weight of the air purifier can be reduced.

The structure of the annular wind outlet screen 41 is in a grid shape, wind may be discharged from two sides symmetrically, and wind may also be discharged along the periphery of the annular wind outlet screen 41. The annular wind outlet screen 41 herein may have a circular shape, an oval shape, a rectangular shape, etc., and is not limited to the circular shape shown in the drawings. The panel 2 may also correspondingly have different shapes such as a circular shape, an oval shape, and a rectangular shape.

It is also to be noted that the bottom plate 42 and the annular wind outlet screen 41 may be an integral structure, or may be a separate structure and are connected together, and the intersection of the bottom plate 42 and the annular wind outlet screen 41 may be in an arc transition connection to improve the visibility of the appearance.

The air filtering assembly 6 includes an efficient fine dust air filter HEPA and an activated carbon filter, and the efficient air filter is mainly used for trapping particulate dust and various suspended matters above 0.5 μm. The activated carbon filter may remove a peculiar smell in the air. The incoming air first passes through the efficient air filter and then through the activated carbon filter.

As a specific implementation of the air purifier provided by the present invention, referring to FIGS. 9 to 11 and 14, the supporting assembly includes three or four supporting legs 5 uniformly distributed around the annular wind outlet screen 41, lower ends of the supporting legs 5 are supported on the ground or a platform, and the panel 2 is fixed at upper ends of the supporting legs in a horizontal state.

The supporting legs 5 in the present embodiment support the wind outlet assembly 4 and allow the panel 2 to be in a horizontal state and usable as a desk. The supporting legs 5 may be long or short, the supporting legs 5 with different length specifications may be designed, when to be placed on the ground to be used as a table, the air purifier with long supporting legs 5 may be selected, and when to be placed on a television cabinet, a desk, or a working platform, the air purifier with short supporting legs 5 may be selected. When the panel 2 is in a horizontal state, the supporting legs 5 may directly fix the panel 2 and the wind outlet assembly 4 together without arranging the connector 11, which can also reduce the cost and the overall weight.

The lower ends of the supporting legs 5 are all opened outwards, so that the support is stable.

The air purifier provided by the present invention is simple in structure, small in size, light in weight, and diversified in functions, can be placed on a table, beside a desk, on a television cabinet, beside a sofa and a bed in a bedroom at home as required, or can be placed on a computer desk, beside a computer desk, on a workbench, etc. flexibly, and can also be used as a table for placing articles. Therefore, it is very convenient and practical.

As a specific implementation of the embodiments of the present invention, referring to FIGS. 9 to 11, and 14 and 17, the supporting legs 5 are bolted to the annular wind outlet screen 41, and a supporting table 51 for supporting the bottom plate 42 is also arranged at upper portions of the supporting legs 5. Since the wind wheel 7 and the air filtering assembly 6 are mounted on the bottom plate 42, the weight borne by the bottom plate 42 is large, so that the supporting legs 5 supports the wind outlet assembly 4 from the bottom plate 42, and the supporting reliability is improved.

Figure 14:
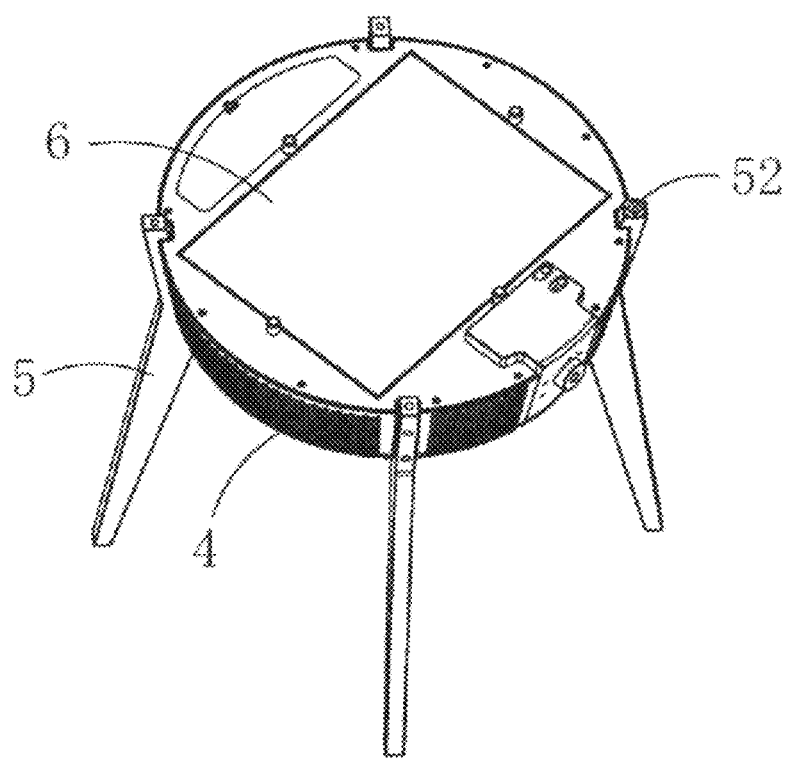
FIG. 14 is a three-dimensional structural view of the air purifier provided in FIG. 9 with a panel removed.
Figure 18:
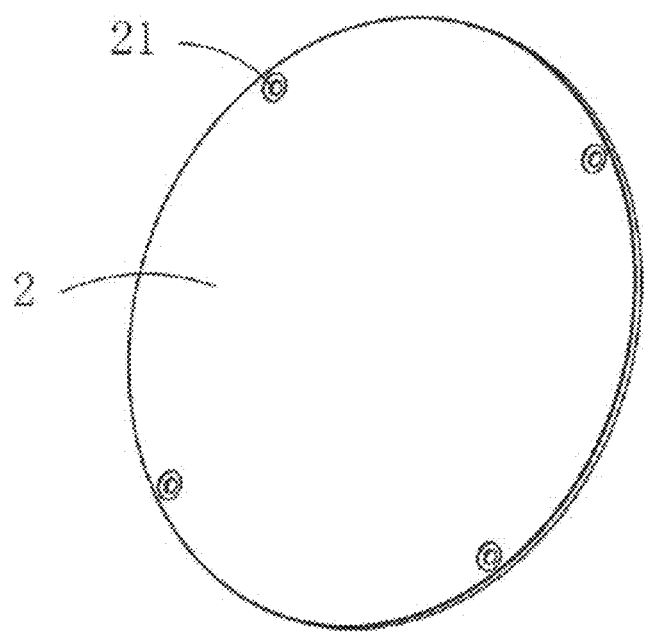
FIG. 18 is a three-dimensional structural view of a panel of the air purifier provided in FIG. 9.
Figure 19:
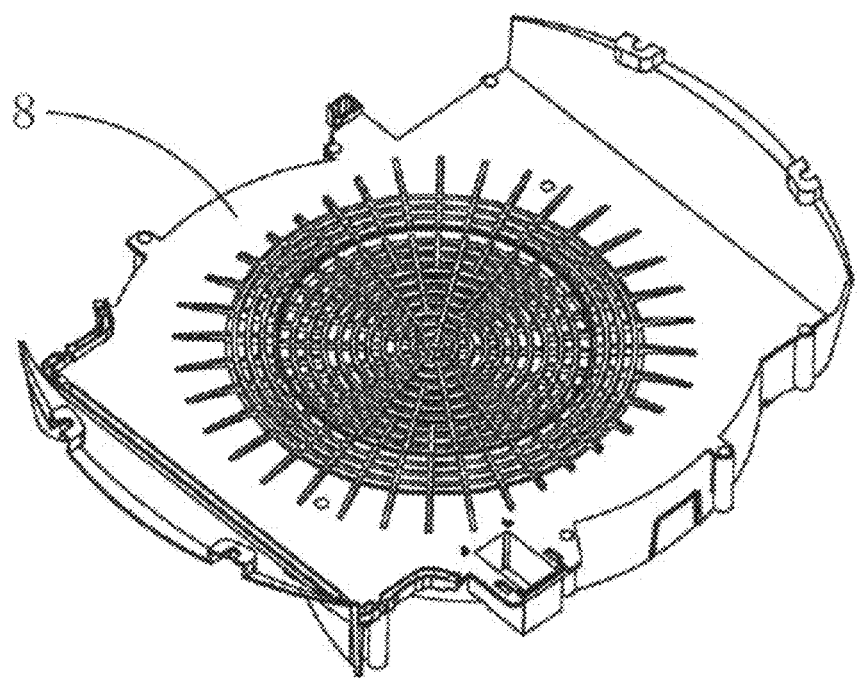
FIG. 19 is a three-dimensional top structural view of a support of the air purifier shown in FIG. 12.
Figure 20:
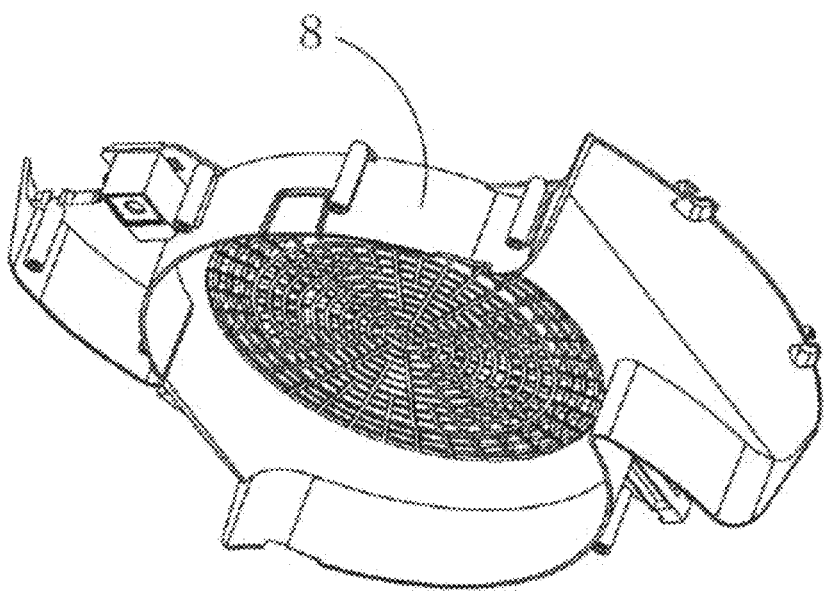
FIG. 20 is a three-dimensional bottom structural view of the support of the air purifier shown in FIG. 19.

Referring to FIGS. 14 and 18, the upper ends of the supporting legs 5 are provided with positioning pins 52, and the panel 2 is provided with positioning holes 21. When the panel 2 is horizontal, the positioning pins 52 may be directly aligned with and inserted into the positioning holes 21 of the panel 2, and mounting and dismounting are very convenient. Of course, the panel 2 may also be provided with buckles which are clamped with clamping holes provided in the supporting legs 5. The connection of the panel 2 to the supporting legs 5 may also have other connection and fixing modes, and is not limited to the solution provided by the present embodiment.

As a specific implementation of the embodiments of the present invention, referring to FIGS. 21 and 22, when the panel 2 is in a vertical state, the supporting assembly includes two supporting feet 10, and the supporting feet 10 are supported on the ground or a platform. When the panel 2 is in a vertical state, since the two supporting feet 10 are arranged on the same side of the annular wind outlet screen 41 or need to be close to each other for supporting, the panel 2 and the wind outlet assembly 4 need to be connected together through the connector 11 to support the panel 2. The connectors 11 are uniformly distributed along the outer circumference of the annular wind outlet screen 41. Four connectors 11 are provided in the present embodiment.

As a specific implementation of the embodiments of the present invention, referring to FIGS. 21 to 22, the connectors 11 include connecting ribs uniformly distributed along an outer circumference of the annular wind outlet screen 41, the connecting ribs being fixedly connected to the annular wind outlet screen 41. The four connecting ribs divide the annular wind outlet screen 41 into four regions. At the positions of the connecting ribs, the annular wind outlet screen 41 has a mounting groove recessed into the cavity, and the connecting ribs and the mounting groove are bolted together. The outside of the connecting ribs is smoothly and transitively engaged with the outer circumferential surface of the annular wind outlet screen 41.

Figure 23:
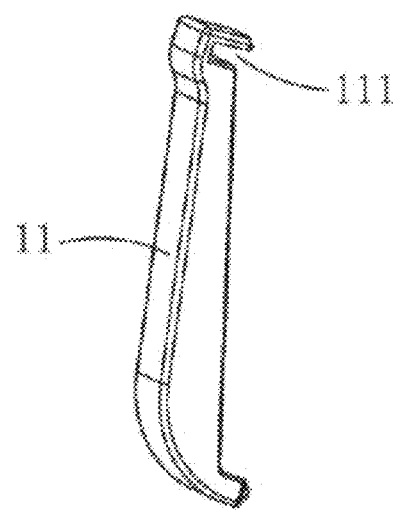
FIG. 23 is a three-dimensional right structural view of a connector of the air purifier provided in FIG. 21.
Figure 24:
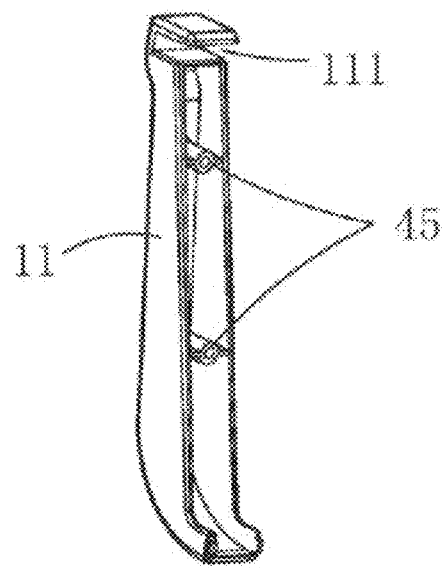
FIG. 24 is a three-dimensional left structural view of the connector of the air purifier provided in FIG. 23.

As a specific implementation of the embodiments of the present invention, referring to FIGS. 23 to 24, the connecting rib is provided with a bayonet 111 for clamping the panel 2. By clamping the panel 2 with the bayonet 111, the overall destroying caused by structural setting of the panel 2 is avoided. In the four connecting ribs, the supporting feet 10 are directly fixed by means of two adjacent connecting ribs, i.e., bolts directly penetrate through the annular wind outlet screen 41 and the connecting ribs to be connected with the supporting feet 10. The bolts connecting the supporting feet 10 penetrate from the outside of the annular wind outlet screen 41, and only the bolts fixing the connecting ribs penetrate from the inside of the annular wind outlet screen 41 to be fixed, thereby avoiding or reducing the exposure of the bolts.

As a specific implementation of the embodiments of the present invention, referring to FIG. 24, an inner stud 45 is arranged on the inner side of the connecting rib, and the connecting rib is bolted to the annular wind outlet screen 41. Inner studs 45 for fixing different components are arranged in the drawings of the present embodiment, and the inner studs 45 arranged at different positions and different orientations have the same function, so that the inner studs are uniformly marked as one serial number herein.

Figure 15:
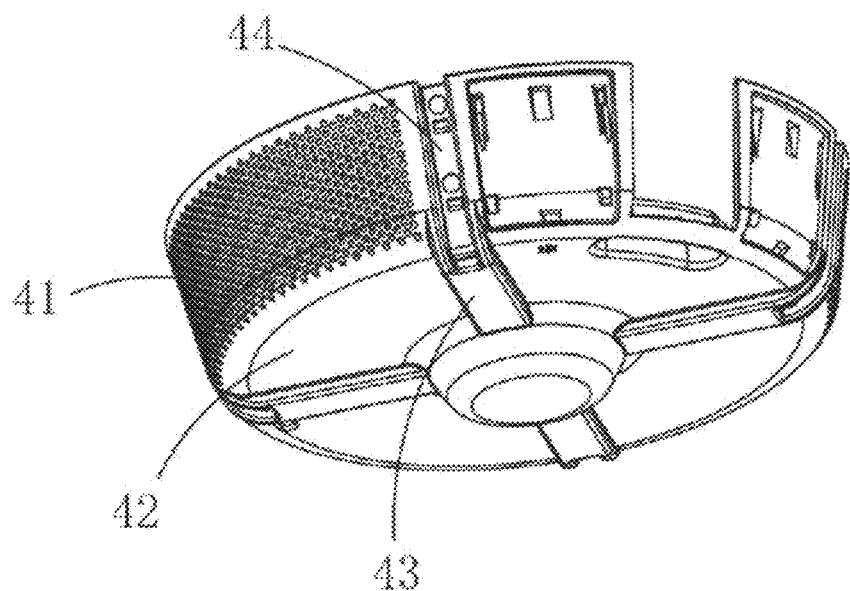
FIG. 15 is a three-dimensional bottom structural view of the wind outlet assembly of the air purifier provided in FIG. 9.
Figure 16:
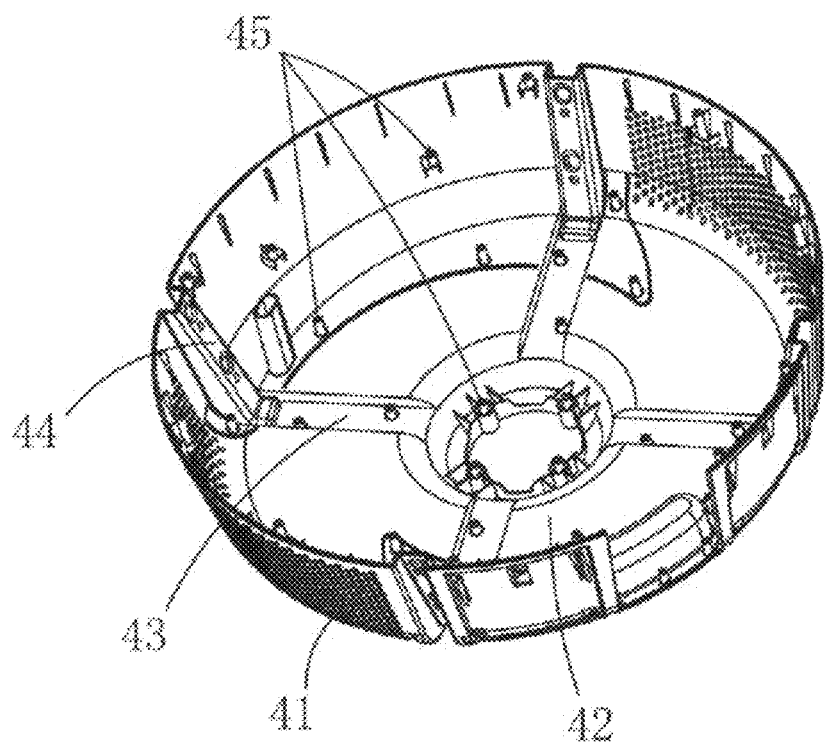
FIG. 16 is a three-dimensional top structural view of the wind outlet assembly of the air purifier provided in FIG. 15.
Figure 17:
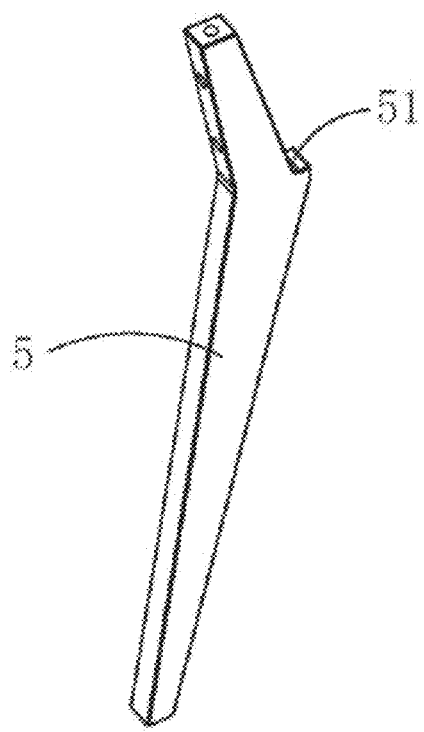
FIG. 17 is a three-dimensional structural view of a supporting leg of the air purifier provided in FIG. 9.

As a specific implementation of the embodiments of the present invention, referring to FIGS. 15 to 16, mounting ribs 44 for mounting the supporting assembly are uniformly arranged around the annular wind outlet screen 41, reinforcing ribs 43 protruding outwards are arranged on an outer surface of the bottom plate 42, and inner studs 45 for mounting the wind wheel 7 and the air filtering assembly 6 are arranged on an inner surface of the bottom plate 42. Herein, the mounting ribs 44 are recessed into the cavity to form a mounting groove when viewed from the outside, the above-mentioned supporting legs 5, connecting ribs, and supporting feet 10 are all mounted in the mounting groove, and the mounting groove is provided with through holes or threaded holes for bolts to pass through for fixing. The mounting ribs 44 not only have the function of improving the strength of the annular wind outlet screen 41, but also directly mount the supporting legs 5, the connecting ribs, and the supporting feet 10 at the position. Through structural integration, the mounting ribs 44 have good significance for reducing the overall size and weight.

The reinforcing ribs 43 at the bottom of the bottom plate 42 play a role in reinforcing the entire wind outlet assembly 4, and since the wind wheel 7 and the air filtering assembly 6 are mounted on the bottom plate 42, the reinforcing ribs 43 are arranged on the bottom plate 42, so that the bottom plate 42 is prevented from being stressed and deformed.

As a specific implementation of the embodiments of the present invention, referring to FIGS. 15 to 16, the reinforcing ribs 43 are radially and uniformly distributed in a radial direction of the bottom plate 42, and are connected with the mounting ribs 44 as a whole. Referring to the drawings, the reinforcing ribs 43 and the mounting ribs 44 are streamlined, so that the overall appearance structure is simple, smooth, and elegant.

Figure 12:
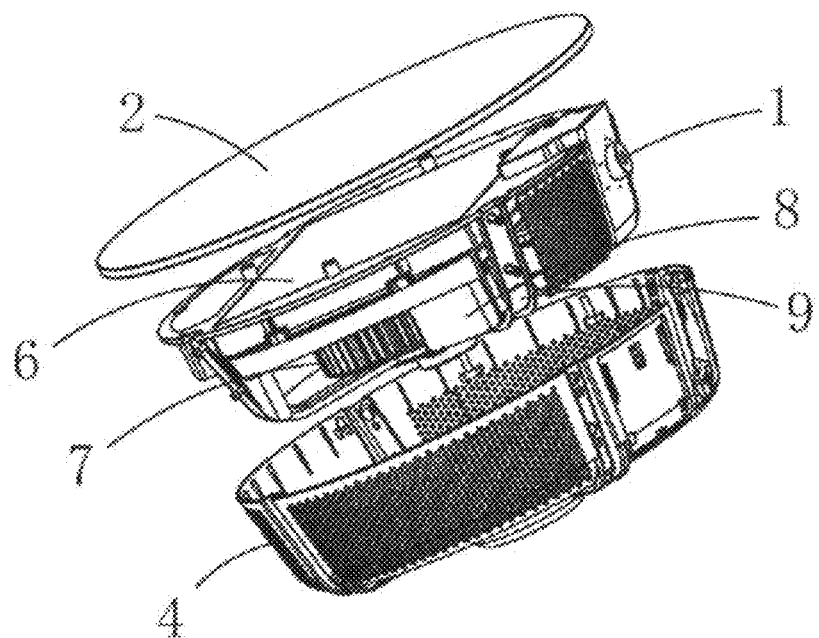
FIG. 12 is a structural view of a disassembled state of the air purifier shown in FIG. 9.
Figure 13:
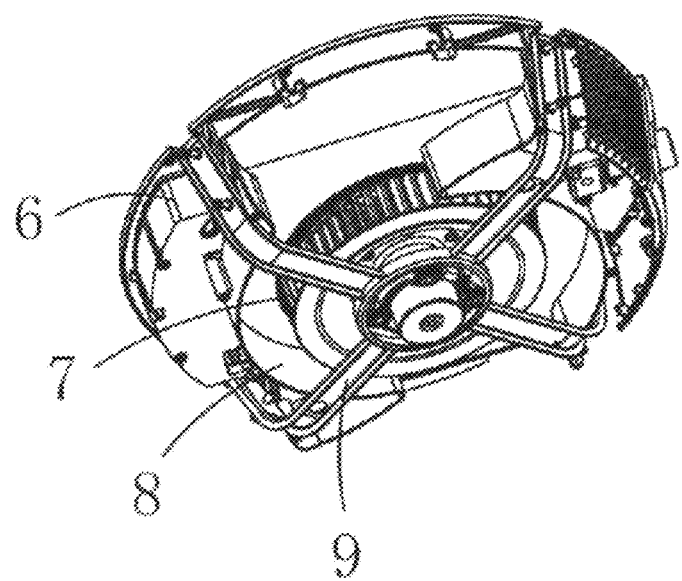
FIG. 13 is a three-dimensional structural view of an internal structure of a wind outlet assembly of the air purifier shown in FIG. 12.

As a specific implementation of the embodiments of the present invention, referring to FIGS. 12 to 13, a support 8 for supporting and fixing the air filtering assembly 6 is arranged in the cavity, the support 8 being fixed on the inner surface of the bottom plate 42. The support 8 is bolted to the inner studs 45 on the bottom plate 42. In the present embodiment, a cross 9 is further arranged below the support 8 in the cavity, and the cross 9 corresponds to the reinforcing ribs 43 and the mounting ribs 44 and is bolted to the reinforcing ribs 43 and the mounting ribs 44. On one hand, the cross plays a role of supporting framework inside the annular wind outlet screen 41, and on the other hand, the cross also supports the air filtering assembly 6.

In the present embodiment, referring to FIGS. 9, 21, and 22, a wind volume adjusting knob 1 is further arranged, and the wind inlet quantity can be adjusted by adjusting the rotating speed of the wind wheel 7, so that the wind outlet quantity can be adjusted. The wind volume adjusting knob 1 is mounted on the annular wind outlet screen 41.

The skilled person realizes that a number of modifications of the embodiments described herein are possible without departing from the scope of the invention, which is defined in the appended claims.

Various aspects of the present invention may be appreciated from the following enumerated example embodiments (EEEs) described with reference to FIGS. 1-8:

EEE1: A table arrangement (100), comprising:
  a table top (102),
  a plurality of legs (104) connectable to the table top (102),
    an air purifier (106) adapted to be placed below the table top (102), and,
  a support structure (702) having a centre element (704) and a plurality of arms (706) connectable to the plurality of legs (104),
    wherein a motor (116) of the air purifier (106) is adapted to be attached to at least the centre element (704) of the support structure (702).

EEE2. The table arrangement (100) according to EEE1, wherein the air purifier (106) is adapted to be attached to the centre element (704) and the plurality of arms (706) of the support structure (702).

EEE3. The table arrangement (100) according to EEE1 or EEE2, wherein the air purifier (106) comprises a shielding surface (114) having at least one perforated section and at least one attachment section, wherein the support structure (702) is adapted to be attached to the attachment section of the shielding surface (114).

EEE4. The table arrangement (100) according to EEE3, wherein the at least one attachment section is adapted to be fastened between the plurality of legs (104) of the table arrangement (100) and the plurality of arms (706) of the support structure (702).

EEE5. The table arrangement (100) according to any one of the preceding EEEs, wherein the centre element (704) of the support structure (702) is ring shaped and adapted to hold the motor (116) of the air purifier (106).

EEE6. The table arrangement (100) according to EEE5, wherein the motor (116) is adapted to protrude downwardly below the centre element (704) of the support structure (702) when held therein.

EEE7. The table arrangement (100) according to EEE5 or EEE6, further comprising a rubber gasket adapted to be placed between the centre element (704) of the support structure (702) and the motor (116) of the air purifier (106) to reduce vibrations.

EEE8. The table arrangement (100) according to any one of the preceding EEEs, wherein a gap (604) is provided between the table top (102) and the air purifier (106) such that an air inlet is formed.

EEE9. The table arrangement (100) according to any one of the preceding EEEs, wherein the plurality of legs (104) is made from wood.

EEE10. The table arrangement (100) according to any one of the preceding EEEs, wherein the support structure (702) is made from metal.

EEE11. The table arrangement (100) according to any one of the preceding EEEs, wherein each of the plurality of legs (104) comprises a support shoulder adapted to receive a portion of the shielding surface (114) of the air purifier (106) and/or the support structure (702).

EEE12. The table arrangement (100) according to any one of the preceding EEEs, further comprising a table top lock (800) for releasably locking the table top (102) to a table base (700) comprising the air purifier (106), said table top lock (800) comprising:
an upper device (802) comprising
   an upper attachment member (804) arranged to be attached to a bottom side of the table top (102), and
   a protruding member (806) provided with a flange (816),
a lower device comprising
   a lower attachment member (810) arranged to be attached to the table base (700),
   a sliding member (812) slidably attached to the lower attachment member (810), provided with an opening (814) and moveable between an unlocked position and a locked position,
such that in the unlocked position a wide section of the opening (814) is facing the protruding member (806), thereby allowing the flange (816) of protruding member (806) to pass,
such that in the locked position a narrow section of the opening (814) is facing the protruding member (806), thereby preventing the flange (816) of the protruding member (806) to pass.

EEE13. The table arrangement according to EEE12, wherein the protruding element comprises a cylindrical element.

EEE14. The table arrangement according to any one of EEE12-EEE13, wherein a tip of the protruding has a bevelled edge.

EEE15. The table arrangement according to EEE12-EEE14, wherein the sliding member is arranged to slide in radial direction.

EEE16. The table arrangement according to EEE12-EEE15, wherein the sliding member is adapted to protrude outside edge of table top in unlocked position.

EEE17: A table top lock for releasably locking a table top to a table base is provided. The table top lock comprises an upper device comprising an upper attachment member arranged to be attached to a bottom side of the table top, and a protruding member provided with a flange, a lower device comprising a lower attachment member arranged to be attached to the table base, a sliding member slidably attached to the lower attachment member, provided with an opening and moveable between an unlocked position and a locked position, such that in the unlocked position a wide section of the opening is facing the protruding member, thereby allowing the flange of protruding member to pass, such that in the locked position a narrow section of the opening is facing the protruding member, thereby preventing the flange of the protruding member to pass.

EEE18. The table top lock according to EEE17, wherein the table base comprises an air purifier.

EEE19: The table top lock according to any one of EEE17-EEE18, wherein the protruding element comprises a cylindrical element.

EEE20: The table top lock according to any one of EEE17-EEE19, wherein a tip of the protruding has a bevelled edge.

EEE21: The table top lock according to any one of EEE17-EEE20, wherein the sliding member is arranged to slide in radial direction.

EEE22: The table top lock according to any one of EEE17-EEE21, wherein the sliding member is adapted to protrude outside edge of table top in unlocked position.

EEE23: A method for locking a table top to a table base is provided. The method comprises attaching an upper attachment member of an upper device to a bottom side of the table top, attaching a lower attachment member of a lower device to the table base, sliding a sliding member of the lower device into an unlocked position such that a wide section of an opening in the sliding member is facing a protruding member of the upper device, feeding a flange of the protruding element through the wide section of the opening, and sliding the sliding member of the lower device into a locked position such that a narrow section of the opening is facing the protruding member, thereby preventing the flange of the protruding member to pass the sliding member.

EEE24. A method for mounting a table arrangement (100) comprising a:
table top (102), a plurality of legs (104) connectable to the table top (102), an air purifier (106) adapted to be placed below the table top (106), and a support structure (702) having a centre element (704) and a plurality of arms (706) connectable to the plurality of legs (104), the method comprising:
securing the plurality of legs (104) of the table arrangement (100) and the plurality of arms (706) of the support structure (702) to each other,
   attaching a motor (116) of the air purifier (106) to at least the centre element (704) of the support structure (702), and
attaching the table top (702) to the plurality of legs (104) of the table arrangement (100).

EEE25. The method according to EEE24, further comprising: fastening a portion of the shielding surface (114) of the air purifier (106) between the plurality of legs (104) of the table arrangement (100) and the plurality of arms (706) of the support structure (702).

EEE26. The method according to EEE24 or EEE25, further comprising: attaching the motor (116) of the air purifier (106) in the centre element (704) of the support structure (702) with a rubber gasket arranged there between.

EEE27. A table (100), comprising:
a table top (102),
a plurality of legs (104) connectable to the table top (102), and an air purifier (106) adapted to be placed below the table top (102), wherein a bottom side of the table top (102) is provided with at least one groove (112) extending in a circumferential direction for preventing liquid from traveling from an outer edge of the table top (102) along the bottom side of the table top (102) and reaching an inner section of the air purifier (106).

EEE28. The table (100) according to EEE27, wherein the inner section of the air purifier (106) comprises at least one air purifying filter (502).

EEE29. The table (100) according to EEE28, wherein the at least one air purifying filter (502) is a HEPA filter or a carbon filter.

EEE30. The table (100) according to any one of EEE27-EEE29, wherein the at least one groove (112) has a cornered cross section.

EEE31. The table (100) according to any one of EEE27-EEE30, wherein the at least one groove (112) has a rounded cross section.

EEE32. The table (100) according to any one of EEE27-EEE31, wherein the at least one groove (112) is provided in an outer periphery of the bottom side of the table top (102).

EEE33. The table (100) according to any one of EEE27-EEE32, wherein the at least one groove (112) has a depth of approximately 3 mm.

EEE34. The table (100) according to any one of EEE27-EEE33, wherein the at least one groove (112) is provided on the bottom side of the table top (102) at a distance of between 5 and 15 mm from an outer edge of the table top (102).

EEE35. The table (100) according to any one of EEE27-EEE34, wherein the table top (102) comprises a plurality of subsequent grooves (112) provided in a direction towards a centre of the table top (102).

EEE36. The table (100) according to any one of EEE27-EEE35, wherein the table top (102) comprises three separate grooves (112).

EEE37. The table (100) according to EEE36, wherein the total width of the three separate grooves (112) is approximately 20 mm.

EEE38. The table (100) according to any one of EEE27-EEE37, wherein the bottom side of the table top (102) is lacquered.

EEE39. The table (100) according to any one of EEE27-EEE38, further comprising an air inlet (604) between the table top (102) and the air purifier (106) when mounted.

EEE40. The table (100) according to any one of EEE27-EEE39, wherein a top section of the air purifier (106) is provided with a hatch for filter service.

EEE41. A method for purifying air using a table (100) comprising a table top (102), a plurality of legs (104) connected to the table top (102), and an air purifier (106) placed below the table top (102), the method comprising:

feeding air into the air purifier (106), preventing liquid from traveling from an outer edge of the table top (102) along the bottom side of the table top (102) and reaching an inner section of the air purifier (106) by means of at least one groove (112) extending in a circumferential direction provided on bottom side of the table top (102), and feeding purified air out of the air purifier (106).

EEE42. A table according to any one of EEE27-EEE40 comprising a table arrangement according to any one of EEE1-EEE16 and/or a table top lock according to any one of EEE17-EEE22.

Various aspects of the present invention may be appreciated from the following enumerated example embodiments (EEEs) described with reference to FIGS. 9-24:

EEE43. An air purifier, comprising:

a panel;

a wind outlet assembly comprising an annular wind outlet screen and a bottom plate connected to one end of the annular wind outlet screen, the panel being located at the other end of the annular wind outlet screen, and a wind inlet for wind intake being provided between the panel and the annular wind outlet screen;

a wind wheel mounted on the bottom plate and located in a cavity defined by the annular wind outlet screen and the bottom plate;

an air filtering assembly mounted in the cavity and located at an end, close to the panel, of the annular wind outlet screen, wherein air is driven by the wind wheel to enter the wind inlet, filtered and purified by the air filtering assembly, and discharged from the annular wind outlet screen; and a supporting assembly supporting the wind outlet assembly from the outside so that the panel is in a horizontal state or a vertical state, the panel being fixedly connected to the supporting assembly or fixedly connected to the wind outlet assembly by means of a connector.

EEE44. The air purifier according to EEE43, wherein the supporting assembly comprises three or four supporting legs uniformly distributed around the annular wind outlet screen, lower ends of the supporting legs are supported on the ground or a platform, and the panel is fixed at upper ends of the supporting legs in a horizontal state.

EEE45. The air purifier according to EEE44, wherein the supporting legs are bolted to the annular wind outlet screen, and a supporting table for supporting the bottom plate is also arranged at upper portions of the supporting legs.

EEE46. The air purifier according to EEE43, wherein the supporting assembly comprises two supporting feet supported on the ground or a platform so that the panel is in a vertical state, and when the panel is in the vertical state, the panel and the wind outlet assembly are connected together through the connector.

EEE47. The air purifier according to EEE46, wherein the connector comprises connecting ribs uniformly distributed along an outer circumference of the annular wind outlet screen, the connecting ribs being fixedly connected to the annular wind outlet screen.

EEE48. The air purifier according to EEE47, wherein the connecting rib is provided with a bayonet for clamping the panel.

EEE49. The air purifier according to EEE47, wherein an inner stud is arranged on the inner side of the connecting rib, and the connecting rib is bolted to the annular wind outlet screen.

EEE50. The air purifier according to any one of EEE43 to EEE49, wherein mounting ribs for mounting the supporting assembly are uniformly arranged around the annular wind outlet screen, reinforcing ribs protruding outwards are arranged on an outer surface of the bottom plate, and inner studs for mounting the wind wheel and the air filtering assembly are arranged on an inner surface of the bottom plate.

EEE51. The air purifier according to EEE50, wherein the reinforcing ribs are radially and uniformly distributed in a radial direction of the bottom plate, and are connected with the mounting ribs as a whole.

EEE52. The air purifier according to EEE43, wherein a support for supporting and fixing the air filtering assembly is arranged in the cavity, the support being fixed on an inner surface of the bottom plate.

The invention claimed is:

1. A table, comprising:
   a table top,
   a plurality of legs connectable to the table top,
   an air purifier adapted to be placed below the table top, and
   an air inlet between the table top and the air purifier,
   wherein a bottom side of the table top is provided with at least one groove extending in a circumferential direction for preventing liquid from traveling from an outer edge of the table top along the bottom side of the table top and reaching an inner section of the air purifier.

2. The table according to claim 1, wherein the inner section of the air purifier comprises at least one air purifying filter.

3. The table-according to claim 2, wherein the at least one air purifying filter is a HEPA filter or a carbon filter.

4. The table according to claim 1 wherein the at least one groove has a cornered cross section.

5. The table according to claim 1, wherein the at least one groove has a rounded cross section.

6. The table according to claim 1, wherein the at least one groove is provided in an outer periphery of the bottom side of the table top.

7. The table according to claim 1, wherein the at least one groove has a depth of approximately 3 mm.

8. The table according to claim 1, wherein the at least one groove is provided on the bottom side of the table top at a distance of between 5 and 15 mm from an outer edge of the table top.

9. The table according to claim 1, wherein the table top comprises a plurality of subsequent grooves provided in a direction towards a centre of the table top.

10. The table according to claim 1, wherein the table top comprises three separate grooves.

11. The table according to claim 10, wherein the total width of the three separate grooves is approximately 20 mm.

12. The table according to claim 1, wherein the bottom side of the table top is lacquered.

13. The table according to claim 1, further comprising an air inlet between the table top and the air purifier when mounted.

14. The table according to claim 1, wherein a top section of the air purifier is provided with a hatch for filter service.

15. A method for purifying air using a table comprising a table top, a plurality of legs connected to the table top, an air purifier placed below the table top, and an air inlet between the table top and the air purifier, the method comprising:
    feeding air into the air purifier,
    preventing liquid from traveling from an outer edge of the table top, along the bottom side of the table top, and reaching an inner section of the air purifier, using at least one groove extending in a circumferential direction provided on a bottom side of the table top, and
    feeding purified air out of the air purifier.

* * * * *